(12) United States Patent
Quinn et al.

(10) Patent No.: US 12,159,481 B2
(45) Date of Patent: *Dec. 3, 2024

(54) GAMING ACTIVITY MONITORING SYSTEMS AND METHODS

(71) Applicant: Angel Group Co., Ltd., Shiga (JP)

(72) Inventors: Louis Quinn, Abbotsford (AU); Duc Dinh Minh Vo, Abbotsford (AU); Nhat Vo, Abbotsford (AU); Subhash Challa, Abbotsford (AU)

(73) Assignee: ANGEL GROUP CO., LTD., Shiga (JP)

( * ) Notice: Subject to any disclaimer, the term of this patent is extended or adjusted under 35 U.S.C. 154(b) by 45 days.

This patent is subject to a terminal disclaimer.

(21) Appl. No.: 18/170,236

(22) Filed: Feb. 16, 2023

(65) Prior Publication Data

US 2023/0196874 A1  Jun. 22, 2023

Related U.S. Application Data

(63) Continuation of application No. 18/003,625, filed as application No. PCT/AU2021/050592 on Jun. 10, 2021.

(30) Foreign Application Priority Data

Jun. 30, 2020 (AU) ................. 2020902206

(51) Int. Cl.
*G06T 7/10* (2017.01)
*G06T 7/73* (2017.01)
(Continued)

(52) U.S. Cl.
CPC ............ *G06V 40/161* (2022.01); *G06T 7/10* (2017.01); *G06T 7/73* (2017.01); *G06T 7/75* (2017.01);
(Continued)

(58) Field of Classification Search
CPC ........................................... G06T 7/10
See application file for complete search history.

(56) References Cited

U.S. PATENT DOCUMENTS 10,475,185 B1  11/2019  Raghavan et al.
2006/0251339 A1  11/2006  Gokturk et al.
(Continued)

FOREIGN PATENT DOCUMENTS

EP  3422307 A1  1/2019
EP  3822929 A1  5/2021
(Continued)

OTHER PUBLICATIONS

International Search Report and Written Opinion for International Application No. PCT/AU2021/050592 dated Sep. 2, 2021.
(Continued)

*Primary Examiner* — Y Lee
(74) *Attorney, Agent, or Firm* — NORTON ROSE FULBRIGHT US LLP

(57) ABSTRACT

Embodiments relate to systems, methods and computer readable media for gaming monitoring. In particular, embodiments process images to determine presence of a gaming object on a gaming table in the images. Embodiments estimate postures of one or more players in the images and based on the estimated postures determine a target player associated with the gaming object among the one or more players.

19 Claims, 13 Drawing Sheets

(51) Int. Cl.
    *G06V 10/82*     (2022.01)
    *G06V 20/40*     (2022.01)
    *G06V 20/52*     (2022.01)
    *G06V 20/60*     (2022.01)
    *G06V 40/10*     (2022.01)
    *G06V 40/16*     (2022.01)
    *G07F 17/32*     (2006.01)
    *H04N 7/18*     (2006.01)

(52) U.S. Cl.
    CPC .............. *G06V 10/82* (2022.01); *G06V 20/42* (2022.01); *G06V 20/52* (2022.01); *G06V 20/60* (2022.01); *G06V 40/103* (2022.01); *G06V 40/171* (2022.01); *G07F 17/3206* (2013.01); *G07F 17/3223* (2013.01); *G07F 17/3234* (2013.01); *G07F 17/3237* (2013.01); *G07F 17/3239* (2013.01); *G07F 17/3241* (2013.01); *H04N 7/183* (2013.01); *G06T 2207/20081* (2013.01); *G06T 2207/20084* (2013.01); *G06T 2207/30201* (2013.01); *G06T 2207/30232* (2013.01); *G06V 2201/10* (2022.01); *G07F 17/322* (2013.01)

(56) References Cited

U.S. PATENT DOCUMENTS

2006/0252554 A1   11/2006   Gururajan et al.
2020/0184278 A1   6/2020   Zadeh et al.

FOREIGN PATENT DOCUMENTS

WO   WO-2017/210564 A1   12/2017
WO   WO-2021095531 A1   5/2021

OTHER PUBLICATIONS

European Search Report dated Oct. 30, 2023 issued in EP Application No. 21832116.4.

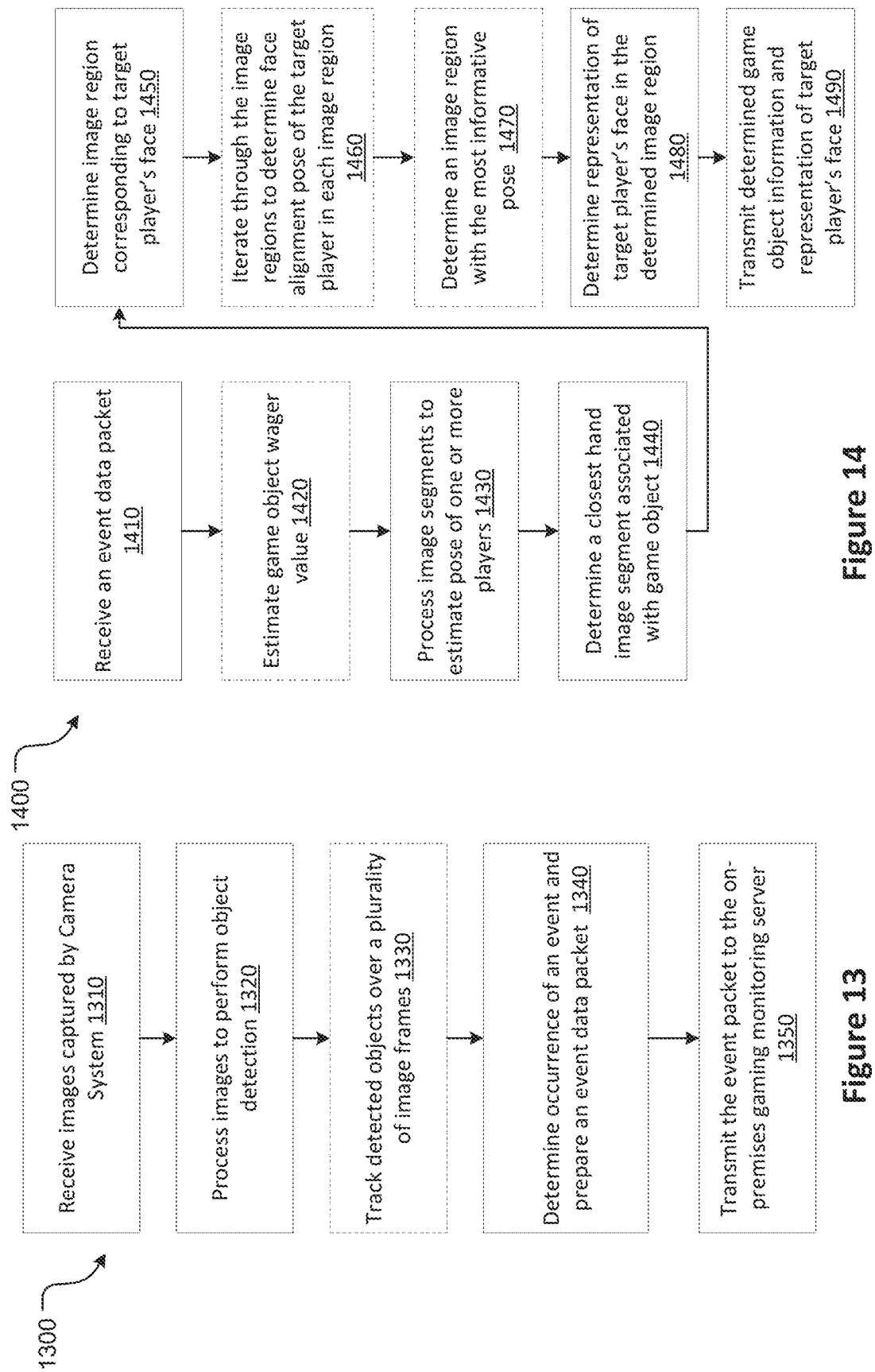

GAMING ACTIVITY MONITORING SYSTEMS AND METHODS

CROSS-REFERENCE TO RELATED APPLICATIONS

This is a Continuation of, and claims priority under 35 U.S.C. § 120 to, U.S. application Ser. No. 18/003,625, filed on Dec. 28, 2022, which is the U.S. National Phase under 35 U.S.C. § 371 of PCT International Application No. PCT/AU2021/050592, which has an international filing date of Jun. 10, 2021, and which claims priority to Australian Patent Application No. 2020902206, filed Jun. 30, 2020, the entire contents of each of which are incorporated herein by reference.

TECHNICAL FIELD

Described embodiments relate generally to computer-implemented methods and computer systems for monitoring gaming activities in a gaming venue. Embodiments apply image processing and machine learning processes to monitor gaming activities.

BACKGROUND

Gaming venues such as casinos am busy environments with several individuals engaging in various gaming activities. Gaming venues can be large spaces, which accommodate numerous patrons in different parts of the gaming venue. Several gaming venues comprise tables or gaining tables on which various games are conducted by a dealer or an operator.

Monitoring of gaming environments may be performed by individuals responsible for monitoring. The dynamic nature of gaming, the significant number of individuals who are free to move around the gaming environment and the size of gaming venues often limits the degree of monitoring that could be performed by individuals. Gaming venue operators can benefit from automated monitoring of gaming activity in the gaming venue. Data regarding gaming activities may facilitate data analytics to improve operations and management of the gaming venue or to determine player ratings, for example, to award player loyalty bonuses.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this specification, a statement that an element may be "at least one of" a list of options is to be understood that the element may be any one of the listed options, or may be any combination of two or more of the listed options.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Some embodiments relate to a system for monitoring gaming activity in a gaming area comprising a gaming table, the system comprising: at least one camera configured to capture images of the gaming area; at least one processor configured to communicate with the at least one camera and a memory; the memory storing instructions executable by the at least one processor to configure the at least one processor to: determine a presence of a first gaming object on the gaming table in a first image from a series of images of the gaming area captured by the at least one camera, the series of images comprising one or more images, responsive to determining the presence of the first gaming object in the first image, process the first image to estimate postures of one or more players in the first image, and based on the estimated postures, determine a first target player associated with the first gaming object among the one or more players.

In some embodiments, the at least one processor is further configured to execute instructions stored in the memory to determine in the series of images an image region of a face of the first target player associated with the first gaming object.

In some embodiments, processing the image to estimate postures of one or more players in the first image comprises identifying one or more periphery indicator regions in the first image, each periphery indicator region corresponding to a distal hand periphery of one or more players.

In some embodiments, each of the one or more periphery indicator regions may correspond to a distal left hand periphery or a distal right hand periphery.

In some embodiments, the at least one processor is further configured to execute instructions stored in the memory to determine the first target player associated with the first gaming object by: estimating a distance of each periphery indicator region from the first gaming object in the first image; identifying a closest periphery indicator region based on the estimated distance; and determining the first target player associated with the first gaming object based on the identified closest periphery indicator region.

In some embodiments, estimating postures of one or more players in the first image comprises: estimating a skeletal model of one or more player, and determining the first target player associated with the first gaming object based on the estimated skeletal model of one or more player.

In some embodiments, estimating the skeletal model of one or more player comprises estimating key points in the first image associated with one or more of: wrists, elbows, shoulders, neck, nose, eyes or ears of the one or more players.

In some embodiments, the at least one processor is further configured to execute instructions stored in the memory to: determine a presence of a second gaming object on the gaming table in a second image from the series of images; responsive to determining the presence of the second gaming object in the second image, process the second image to estimate postures of players in the second image; based on the estimated postures, determine a second target player associated with the second gaming object among the players.

In some embodiments, the first gaming object comprises any one of: a game object, a token, a currency note or a coin.

In some embodiments, the memory comprises one or more posture estimation machine learning models trained to estimate postures of one or more players in the series of images.

In some embodiments, the one or more posture estimation machine learning models comprise one or more deep learning artificial neural networks trained to estimate postures of one or more players in the captured images.

In some embodiments, identifying a face of the first target player further comprises determining a vector representation of the image region of the face of the first target player using a face recognition machine learning model stored in the memory.

In some embodiments, the at least one processor is further configured to estimate a game object value associated with the first gaming object.

In some embodiments, determining presence of a first gaming object on the gaming table further comprises determining a position on the gaming table zone of the first gaming object.

In some embodiments, the at least one processor is further configured to execute instructions stored in the memory to identify in the series of images a plurality of face regions corresponding to a face of the first target player associated with the first gaming object.

In some embodiments, the at least one processor is further configured to execute instructions stored in the memory to process the plurality of face regions to determine face orientation information of the first target player's face in each of the plurality of face regions.

In some embodiments, the at least one processor is further configured to execute instructions stored in the memory to process the face orientation information of the first target player's face in each of the plurality of face regions to determine a most head-on face region corresponding to the target player.

Some embodiments relate to a method for monitoring gaming activity in a gaming area comprising a gaming table, the method comprising: providing at least one camera configured to capture images of the gaming area, at least one processor configured to communicate with the at least one camera and a memory storing instructions executable by the at least one processor; determining by the at least one processor, presence of a first gaming object on the gaming table in a first image from a series of images of the gaming area captured by the at least one camera, the series of images comprising one or more images: responsive to determining the presence of the first gaming object in the first image, processing by the at least one processor the first image to estimate postures of one or more players: based on the estimated postures, determining by the at least one processor a first target player associated with the first gaming object among the one or more players.

Some embodiments further comprise identifying by the at least one processor in the series of images an image region of a face of the first target player associated with the first gaming object.

In some embodiments, estimating postures of one or more players in the first image comprises identifying one or more periphery indicator regions in the first image, each periphery indicator region corresponding to a distal hand periphery of one or more players.

In some embodiments, each of the one or more periphery indicator regions may correspond to a distal left hand periphery or a distal right hand periphery.

Some embodiments further comprise determining by the at least one processor the first target player associated with the first gaming object by: estimating a distance of each periphery indicator region from the first gaming object in the first image; identifying a closest periphery indicator region based on the estimated distance: and determining the first target player associated with the first gaming object based on the identified closest periphery indicator region.

In some embodiments, estimating postures of one or more players in the first image comprises estimating a skeletal model of one or more player, and determining the first target player associated with the first gaming object is based on the estimated skeletal model of one or more player.

In some embodiments, estimating the skeletal model of one or more player comprises estimating key points in the first image associated with one or more of: wrists, elbows, shoulders, neck, nose, eyes or ears of the one or more players.

Some embodiments further comprise: determining by the at least one processor, presence of a second gaming object on the gaming table in a second image from the series of images; responsive to determining the presence of the second gaming object in the second image, process by the at least one processor the second image to estimate postures of one or more players; based on the estimated postures, determine by the at least one processor, a second target player associated with the second gaming object among the one or more players.

In some embodiments, the first gaming object comprises any one of: a game object, a token, a currency note or a coin.

In some embodiments, the memory comprises one or more posture estimation machine learning models trained to estimate postures of one or more players in the series of images.

In some embodiments, the one or more posture estimation machine learning models comprise one or more deep learning artificial neural networks trained to estimate postures of one or more players in the captured images.

In some embodiments, identifying by the at least one processor, an images region of a face of the first target player comprises extracting a vector representation of the face of the first target player using a face recognition machine learning model stored in the memory.

The method of some embodiments further comprises estimating by the at least one processor a game object value associated with the first gaming object.

In some embodiments, determining presence of a first gaming object on the gaming table further comprises determining a gaming table zone associated with the first gaming object.

The method of some embodiments further comprises identifying in the series of images a plurality of face regions corresponding to a face of the first target player associated with the first gaming object.

The method of some embodiments further comprises processing the plurality of face regions to determine face orientation information of the first target player's face in each of the plurality of face regions.

The method of some embodiments further comprises processing the face orientation information of the first target player's face in each of the plurality of face regions to determine a most head on face region corresponding to the target player.

Some embodiments relate to a system for monitoring gaming activity in a gaming area comprising a gaming table, the system comprising: at least one camera configured to capture images of the gaming area; an edge gaming monitoring computing device provided in proximity of the gaming table, the edge gaming monitoring computing device comprising a memory and at least one processor having access to the memory and configured to communicate with the at least one camera; the memory storing instructions executable by the at least one processor to configure the at least one processor to: determine a presence of a first gaming object on the gaming table in a first image from a series of images of the gaming area captured by the at least one camera; responsive to determining the presence of the first gaming object in the first image, track the first gaming object in a plurality of images within the series of images; determine object detection event data, the object detection event data comprising image data extracted from a plurality of images and metadata corresponding to the first gaming object; and transmit the object detection event data to a gaming monitoring server.

In some embodiments, the object detection event data is determined in response to tracking of the first gaming object in at least two or more of the plurality of images within the series of images.

In some embodiments, the at least one processor is further configured to determine a presence of one or more players in the series of images of the gaming area.

In some embodiments, the image data extracted from the plurality of images comprises: image data corresponding to the one or more players and image data corresponding to the first game object.

Some embodiments relate to a system for monitoring gaming activity in a gaming area, the system comprising: a gaming monitoring server comprising at least one processor configured to communicate with a memory; the memory storing instructions executable by the at least one processor to configure the at least one processor to: receive object detection event data from a table gaming monitoring computing device, the object detection event data comprising image data corresponding to the plurality of images and metadata corresponding to the first gaming object; process the image data corresponding to the plurality of images to estimate postures of one or more players; based on the estimated postures, determine a first target player associated with the first gaming object among the one or more players.

In some embodiments, the at least one processor is further configured to identify in the plurality of images a plurality of face regions of the first target player associated with the first gaming object.

In some embodiments, the at least one processor is further configured to process the plurality of face regions of the first target player to determine face orientation information of a first target player's face in each of the plurality of face regions.

In some embodiments, the at least one processor is further configured to process the face orientation information of the first target player's face in each of the plurality of face regions to determine a most head on face region corresponding to the target player.

In some embodiments, the most head on face region corresponding to the target player relates to a face region that is most information rich face region for face recognition operations.

Some embodiments relate to a method for monitoring gaming activity in a gaming area comprising a gaming table, the method comprising: providing at least one camera configured to capture images of the gaming area, at least one processor configured to communicate with the at least one camera and a memory storing instructions executable by the at least one processor; determining a presence of a first gaming object on the gaming table in a first image from a series of images of the gaming area captured by the at least one camera; responsive to determining the presence of the first gaming object in the first image, tracking the first gaming object in a plurality of images within the series of images; determining object detection event data, the object detection event data comprising image data extracted from a plurality of images and metadata corresponding to the first gaming object: and transmitting the object detection event data to a gaming monitoring server.

In some embodiments, the object detection event data is determined in response to tracking of the first gaming object in at least two or more of the plurality of images within the series of images.

The method of some embodiments further comprises determining a presence of one or more players in the series of images of the gaming area.

In some embodiments, the image data extracted from the plurality of images comprises: image data corresponding to the one or more players and image data corresponding to the first game object.

Some embodiments relate to a method for monitoring gaming activity in a gaming area, the method comprising: optionally providing a gaming monitoring server comprising at least one processor configured to communicate with a memory, the memory storing instructions executable by the at least one processor; receiving at a gaming monitoring server object detection event data from a gaming monitoring computing device, the object detection event data comprising image data corresponding to a plurality of images and metadata corresponding to a first gaming object; processing the image data by the gaming monitoring server to estimate postures of one or more players in the plurality of images; based on the estimated postures, determining by the gaming monitoring server a first target player associated with the first gaming object among the one or more players.

In some embodiments, the method comprises identifying in the plurality of images a plurality of face regions of the first target player associated with the first gaming object.

The method of some embodiments further comprises processing the plurality of face regions of the first target player to determine face orientation information of a first target player's face in each of the plurality of face regions.

The method of some embodiments further comprises processing the face orientation information of the first target players face in each of the plurality of face regions to determine a most head-on face region corresponding to the target player.

In some embodiments, the most head-on face region corresponding to the target player relates to a face region that is a most information rich face region for face recognition operations.

In some embodiments, the gaming monitoring server comprises a gaming monitoring server located in a gaming premises or a gaming monitoring server located remote to the gaming premises.

In some embodiments, the gaming monitoring server comprises a gaming monitoring server located in a gaming premises or a gaming monitoring server located remote to the gaming premises.

In some embodiments, the gaming monitoring server comprises a secure data storage component for the object detection event data and the determined target player information.

In some embodiments, the at least one camera and the edge gaming monitoring computing device may be a part of a smartphone or a tablet computing device.

In some embodiments, the captured images comprise depth of field images; and determination of a presence of a first gaming object on the gaming table is based on the depth of field images.

Some embodiments relate to non-transient computer readable storage media storing program code which when executed by at least one processor configures the at least one processor to perform the method of any one of the embodiments.

BRIEF DESCRIPTION OF FIGURES

FIG. 13 is a flowchart of apart of a method of gaming monitoring performed by a table gaming monitoring device of FIG. 11;

FIG. 14 is a flowchart of a part of a method of gaming monitoring performed by an on-premises gaming monitoring server of FIG. 11.

DETAILED DESCRIPTION

Figure 1:
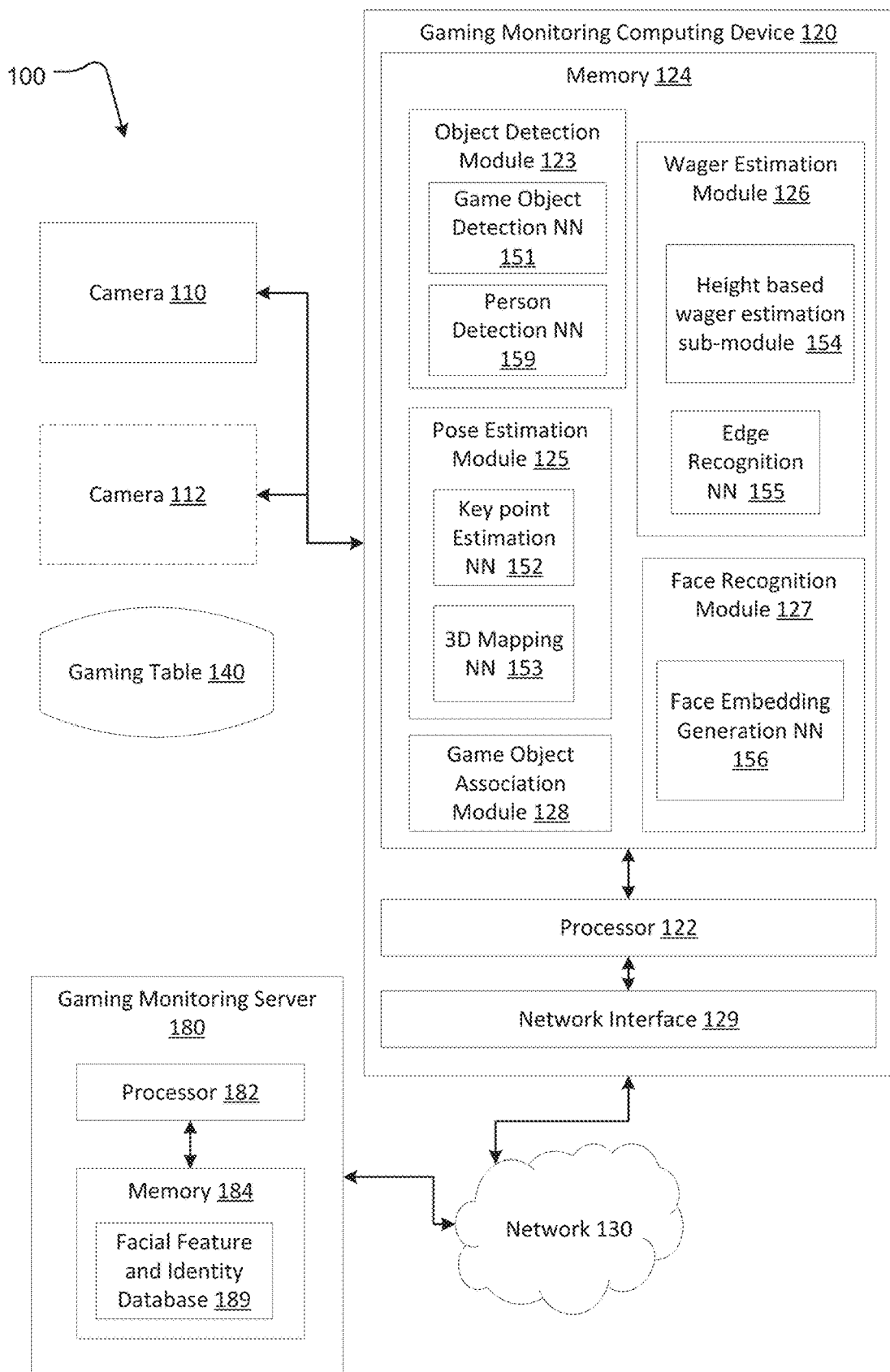
FIG. 1 is a block diagram of a gaming monitoring system according to some embodiments.

Various table-based games are played in gaming venues. Gaines may include baccarat, blackjack, roulette, and craps, for example. Such games may involve a random event or a series of random events with a random or unpredictable outcome over which players or participants or patrons may make wagers or a series of wagers. The random events may include drawing or allocation of a card or throwing of dice or a roll of a roulette wheel. Players participate in a game by placing game objects, at certain locations on the gaming table. Game objects may include chips, cards or tokens issued by the gaming venue, or coins or notes, for example. In several games, the tables have defined zones or areas that are associated with specific outcomes in the game. For example, in the game of baccarat, the gaming table comprises zones or regions on the table surface corresponding to a player and a banker. Bets on specific outcomes or a random event in a game may be placed by patrons by placing game objects in the respective zones or regions associated with specific outcomes.

In some games, such as blackjack, players may be seated on particular parts of a gaming table and may place bets on their respective hands of cards by placing game objects in a zone or area of the table designated to them. However, it is possible for seated players to also place wagers on the hands of other seated players on the table. It is also possible for players not seated on a table to place wagers on the hands of one or more of the seated players. This practice is known as back betting. With several players participating in games, some seated and others not seated, and each player placing wagers on different zones or regions in a fast-paced gaming environment, it may be challenging to monitor the activity of each player. In addition, players may move through various gaming tables in a venue over the course of a visit, making monitoring each player over the course of their visit more challenging.

Due to the dynamic and fast-paced nature of gaming environments, monitoring and surveillance of gaming events using image data can be highly computationally intensive. To identify objects or identify events in image data of a gaming environment with a reasonable degree of confidence, often a high resolution of image data is required. For example, image data with a resolution of 720p (1280×720), 1080p (1920×1080), 4MP (2560×1920) or greater may be captured at a frame rate of 10 frames per second or greater. Gaming premises or venues may comprise a large number of gaming tables or gaming environments. For example, gaming premises may comprise a thousand or more gaming tables or gaming environments. Each gaming environment may include a gaming table or a gaming area where gaming may occur. Each gaming environment may be monitored using one or more sensors, including a camera and/or other imaging and/or ranged sensors.

A camera capturing image data at a resolution of 1080p at 30 frames per second may generate image data at a rate of 2.5 mbps (megabits per second), for example. In a gaming premise or venue with hundreds or thousands of gaming tables or gaming environments, each gaming environment may be provided with two cameras, and the total image data may be generated at a rate of 5 gbps, for example. In some embodiments, the image data may also comprise data from a camera capturing images in an image spectrum not visible to the naked eye (infrared spectrum for example). In some embodiments, the image data may also comprise data from a depth sensor or a depth camera or a 3D camera capturing depth or 3D scene information of a gaming environment. The additional sources of image data may further increase the volume and velocity of image data generated from surveillance of gaming environments.

According to some embodiments of the present disclosure, the significant velocity and volume of data generated by the sensors monitoring the gaming environment can be addressed by a specific distributed computing architecture to efficiently process the image data and derive insights from the captured data.

Gaming environments also impose additional constraints on the deployment of distributed computing systems. For example, placement of a computing device in a gaming environment (for example, near or underneath a gaming table) for the execution of processing power-intensive operations may generate an undesirable amount of heat, which may create a safety risk, such as a fire risk, or may necessitate additional cooling equipment, which requires further cost, space and power. Within the tight constraints of a gaming environment, including physical space, power and security constraints, it may not be practical to provide cooling capabilities in a gaming environment.

Some embodiments provide an improved distribution of computing operations within a distributed computing environment deployed in gaming premises to meet the constraints imposed by the gaming environment, while providing the computing capability to effectively monitor large gaming environments. Some embodiments also provide a distributed monitoring system that can be scaled to cover larger premises or that can be dynamically scaled depending on variations in occupancy within the premises. Some embodiments also allow for dynamic variations in the degree of monitoring or monitoring capabilities implemented by the distributed monitoring system. For example, additional computational monitoring capabilities may be efficiently deployed by the distributed monitoring system across some or all gaming environments within gaming premises using the distributed computing system. Some embodiments also enable scaling of computational resources of the distributed monitoring system to monitor more than one gaming premise.

Some embodiments relate to computer-implemented methods and computer systems to monitor gaming activity in gaming premises using distributed computing systems and/or devices and use the machine learning techniques to assist the gaming venue operators in responding to gaming anomalies or irregularities expediently.

Some embodiments relate to computer-implemented methods and computer systems to monitor gaming activity in a gaming venue. Embodiments incorporate one or more cameras positioned to capture images of a gaming area including a gaming table. One or more cameras are positioned to capture images of the gaming table and also images of players in the vicinity of the gaming table participating in a game. The embodiments incorporate image processing techniques including object detection, object tracking, pose estimation, image segmentation, and face recognition, to monitor gaming activity. Embodiments rely on machine learning techniques, including deep learning techniques, to perform the various image processing tasks. Some embodiments performing the gaming monitoring tasks in real-time or near real-time use the machine learning techniques to assist the gaming venue operators in responding to gaming anomalies or irregularities expediently.

Some embodiments relate to a method for gaming monitoring. The method of gaming monitoring may comprise receiving by a computing device a series of images and timestamp information of a capture time of each image in the series of images. The series of images may be in the form of a video feed. Each image of the series of images may be an image of a gaming environment. The computing device processes a first image in the series of images to determine a first event trigger indicator in the first image. The computing device may be configured to identify a gaming monitoring start event based on the determined first event trigger indicator. Responsive to identifying the gaming monitoring start event, the computing device may initiate transmission of image data of the first image and images in the series of images captured subsequent to the first image to an upstream computing device. The computing device may be configured to process a second image in the series of images to determine a second event trigger indicator in the second image. The second image may be an image captured subsequent to the first image. The computing device may identify a gaming monitoring end event based on the determined second trigger indicator. Responsive to the identifying the gaming monitoring end event, the computing device may be configured to terminate transmission of the image data.

In some embodiments, the method of gaming monitoring may comprise: receiving at an upstream computing device from a computing device image data of images captured in the gaming environment and corresponding timestamp information. The upstream computing device may be configured to process the received image data to detect a game object and an image region corresponding to the detected game object. The upstream computing device may be configured to process the image region corresponding to the identified game object to determine a game object attribute.

In some embodiments, the method of gaming monitoring may comprise: receiving by a computing device a series of images and timestamp information of a capture time of each image in the series of images. Each image of the series of images may an image of a gaming environment. In embodiments, the series of images may be received as a video feed or a video. The computing device may process a first image in the series of images to determine an event trigger indicator in the first image. The computing device may identify a gaming monitoring event based on the determined event trigger indicator. The computing device may transmit the image data of the first image and images proximate to the first image in the series of images to an upstream computing device. Determining the event trigger indicator may comprise detection of a first game object in the first image, wherein the first game object may not have been detected in an image captured prior to the first image in the series of images.

Some embodiments may relate to a computing device or an edge computing device or an upstream computing device configured to perform gaming monitoring according to the methods described above. Some embodiments relate to computer executable media storing program code which when executed by a processor, configures the processor to perform the method of gaming monitoring according to the methods described above.

FIG. 1 is a block diagram of a gaming monitoring system 100 according to some embodiments. The gaming monitoring system 100 may be configured to monitor gaming activity on a specific gaming table 140 in a gaming venue. The gaming monitoring system 100 may comprise a first camera 110. The gaming monitoring system 100 may optionally comprise a second camera 112. In some embodiments, the gaming monitoring system 100 may comprise more than two cameras, each camera capturing images of the surface of the table from a different perspective of the gaming table. The first camera 110 is positioned to capture images of an upper (playing) surface of the gaming table 140 and players near the gaming table participating in gaming activity. The first camera 110 is so positioned to also include faces of the various players in the captured images. The second camera 112 and any other cameras may be similarly positioned at different locations around the gaming table 140 to capture images from different angles of the gaming table 140 and the players participating in gaming.

The first camera 110 and/or second camera 112 may capture images at a resolution of 1280×720 pixels or higher, for example. The first camera 110 and/or second camera 112 may capture images at a rate of 20 frames per second or higher, for example. In some embodiments, the first camera 110 and/or second camera 112 may include a See3CAM 130, a UVC-compliant AR1335 sensor-based 13MP autofocus USB camera. In some embodiments, the first camera 110 and/or second camera 112 may include an AXIS P3719-PLE Network Camera. Any additional (e.g. third, fourth, fifth, sixth) cameras positioned to capture images of the gaming table 140 may have similar characteristics or operating parameters to those indicated above for first and second cameras 110, 112.

First and second cameras 110, 112 (and any additional cameras included as part of system 100) may be positioned or mounted on a wall or pedestal or pole with a substantially uninterrupted view of the table playing surface and oriented so as to capture images in a direction looking from a dealer side of the table 140 toward a player side and from outside or edge of the table 140 toward an opposite side, at least partly laterally across the table playing surface and taking in an image area that includes space vertically above the table surface and vertically above the player side by at least a metre (up to about two metres), for example.

The gaming monitoring system 100 also comprises a gaming monitoring computing device 120. The gaming monitoring computing device 120 is configured to communicate with camera 110 and camera 112 and any additional cameras present as part of system 100. Communication between the computing device 120 and the cameras 110 and 112 may be provided through a wired medium such as a Universal Serial Bus cable, for example. In some embodiments, communication between the computing device 120 and the cameras 110 and 112 may be provided through a wireless medium such as a Wi-Fi™ network or other short-range, low power wireless network connection. In some embodiments, camera 110 and 120 may be connected to a computer network and configured to communicate over the computer network using an internet protocol, for example.

The computing device 120 may be positioned in a vicinity of the gaming table 140 being monitored. For example, the computing device 120 may be positioned in a closed chamber or cavity underneath the gaming table. In some embodiments, the computing device 120 may be positioned away from the gaming table 140 but configured to communicate with the cameras 110 and 112 over a wired or wireless communication link.

The computing device 120 comprises at least one processor 122 in communication with a memory 124 and a network interface 129. Memory 124 may comprise both volatile and non-volatile memory. The network interface 129 may enable communication with other devices such as cameras 110, 112 and communication over network 130, for example.

Memory 124 stores executable program code to provide the various computing capabilities of the gaming monitoring system 100 described herein. Memory 124 comprises at least: an object detection module 123, a pose estimation module 125, a game object value estimation module 126, a face recognition module 127, and a game object association module 128.

The various modules stored in the memory 124 for implementation by the at least one processor 122 may incorporate or have functional access to machine learning based data processing models or computation structures to perform the various tasks associated with monitoring of gaming activities. In particular, software code modules of various embodiments may have access to AI models that incorporate deep learning based computation structures, including artificial neural networks (ANNs). ANNs are computation structures inspired by biological neural networks and comprise one or more layers of artificial neurons configured or trained to process information. Each artificial neuron comprises one or more inputs and an activation function for processing the received inputs to generate one or more outputs. The outputs of each layer of neurons are connected to a subsequent layer of neurons using links. Each link may have a defined numeric weight which determines the strength of a link as information progresses through several layers of an ANN. In a training phase, the various weights and other parameters defining an ANN are optimised to obtain a trained ANN using inputs and known outputs for the inputs. The optimisation may occur through various optimisation processes, including back propagation. ANNs incorporating deep learning techniques comprise several hidden layers of neurons between a first input layer and a final output layer. The several hidden layers of neurons allow the ANN to model complex information processing tasks, including the tasks of object detection, pose estimation and face recognition performed by the gaming monitoring system 100.

In some embodiment, various modules implemented in the memory 124 may incorporate one or more variants of convolutional neural networks (CNNs, a class of deep neural networks to perform the various image processing operations for gaming monitoring. CNNs comprise various hidden layers of neurons between an input layer and an output layer to that convolve an input to produce the output through the various hidden layers of neurons.

The object detection module 123 comprises program code to detect particular objects in images received by the computing device 120 from the cameras 110 and 112. Objects detected by the object detection module 123 may comprise game objects such as chips, cash, coins or notes placed on a gaming table 140. The object detection module 123 may also be trained to determine a region or zone of the gaming table where the game object is or can be detected. An outcome of the object detection process performed by the object detection module 123 may be or include information regarding a class to which each identified object belongs and information regarding the location or region of the gaming table where an identified object is detected. The location of identified objects may be indicated by image coordinates of a bounding box surrounding a detected object or an identifier of the region of the gaming table in one or more images where the object was detected, for example. The outcome of object detection may also comprise a probability number associated with a confidence level of the accuracy of the class of the identified object, for example. The object detection module 123 may also comprise program code to identify a person, a face or a specific body part of a person in an image. The object detection module 123 may comprise a game object detection neural network 151 trained to process images of the gaming table and detect game objects placed on the gaming table. The object detection module 123 may also comprise a person detection neural network 159 trained to process an image and detect one or more persons in the image or parts of one or more persons, for example, faces. The object detection module 123 may produce (as an output of the neural network 159) results in the form of coordinates in a processed image defining a rectangular bounding box around each detected object. The bounding boxes may overlap for objects that may be placed next to each other or are partially overlapping in an image.

The object detection module 123 may incorporate a region-based convolutional neural network (R-CNN) or one of its variants including Fast R-CNN or Faster-R-CNN or Mask R-CNN, for example, to perform object detection. The R-CNN may comprise three modules: a region proposal module, a feature extractor module and a classifier module. The region proposal module is trained to determine one or more candidate bounding boxes around potentially detected objects in an input image. The feature extractor module processes parts of the input image corresponding to each candidate bounding box to obtain a vector representation of the features in each candidate bounding box. In some embodiments, the vector representation generated by the feature extractor module may comprise 4096 elements. The classifier module processes the vector representations to identify a class of the object present in each candidate bounding box. The classifier module generates a probability score representing the likelihood of the presence of each class or objects in each candidate bounding box. For example, for each candidate bounding box, the classifier module may generate a probability of whether the bounding box corresponds to a person or a game object.

Based on the probability scores generated by the classifier module and a predetermined threshold value, an assessment may be made regarding the class of object present in the bounding box. In some embodiments, the classifier may be implemented support vector machine. In some embodiments, the object detection module 123 may incorporate a pre-trained ResNet based convolutional neural network (for example ResNet-50) for feature extraction from images to enable the object detection operations.

In some embodiments, the object detection module 123 may incorporate a you look only once (YOLO) model for object detection. The YOLO model comprises a single neural network trained to process an input image and predict bounding boxes and class labels for each bounding box directly. The YOLO model splits an input image into a grid of cells. Each cell within the grid is processed by the YOLO model to determine one or more bounding boxes that comprise at least a part of the cell. The YOLO model is also trained to determine a confidence level associated with each bounding box, and object class probability scores for each bounding box. Subsequently the YOLO model considerers each bounding box determined from each cell and the respective confidence and object class probability scores to determine a final set of reduced bounding boxes around objects with an object class probability score higher than a predetermined threshold object class probability score.

In some embodiments, the object detection module 123 implements one or more image processing techniques described in the published PCT specifications 'System and method for machine learning driven object detection' (publication number: WO/2019/068141) or 'System and method for automated table game activity recognition' (publication number: WO/2017/197452), the contents of which are hereby incorporated by reference.

The pose estimation module 125 comprises executable program code to process one or more images of players in a gaming environment to identify postures of the one or more players. Each identified posture may comprise a location of a region in an image corresponding to a specific body part of a player. For example, the identified body parts may comprise left or right hands, left or right wrists, a left or right distal-hand periphery in an image, or a face.

The pose estimation module 125 may be configured to identify postures of multiple persons in a single image without any advance knowledge of the number of persons in an image. Since gaming venues are dynamic and fast-paced environments with several patrons moving through different parts of the venue, the capability to identify multiple persons helps to improve the monitoring capability of the gaming monitoring system 100. The pose estimation module 125 may comprise a key point estimation neural network trained to estimate key points corresponding to specific pails of one or more persons in an input image. The pose estimation module 125 may comprise a 3D mapping neural network trained to map pixels associated with one or more persons in an image to a 3D surface model of a person.

In some embodiments, pose estimation may involve a top-down approach, wherein a person in an image is identified first, followed by the posture or the various parts of the person. The object detection module 123 may be configured to identify portions or regions of an image corresponding to a single person. The pose estimation module 125 may rely on the identified portions or regions of the image corresponding to a single person and process each identified portion or region of the image to identify the posture of the person.

In some embodiments, pose estimation may involve a bottom-up approach, wherein various body parts of all persons in an image are identified first, followed by a process of establishing relationships between the various parts to identify the postures of each person in the image. The object detection module 123 may be configured to identify portions or regions of an image corresponding to specific body parts of persons, such as a face, hands, shoulders, or legs, for example. Each specific portion or region in an image corresponding to a specific body part may be referred to as a key point. The pose estimation module 125 may receive from the object detection module 123 information regarding the identified key points, for example, coordinates of each key point and the body part associated with each key point. Based on this received information, the pose estimation module 125 may relate the identified key points with each other to identify a posture of one or more persons in the image.

In some embodiments, the pose estimation module 125 may incorporate the OpenPose framework for pose estimation. The OpenPose framework comprises a first feedforward ANN trained to identify body part locations in an image in the form of a confidence map. The confidence maps comprise an identifier for a part identified in a region of an image, and a confidence level in the form of a probability of confidence associated with the detection. The first feedforward ANN is also trained to determine part affinity field vectors for the identified parts. The part affinity field vectors represent associations or affinity between the parts identified in the confidence map. The determined part affinity field vectors and the confidence maps are iteratively pruned by a Convolutional Neural Network (CNN) to remove weaker part affinities and ultimately predict a posture of one or more persons in an image. Output of the pose estimation module 125 may comprise co-ordinates or each part (key point) identified for each person identified in an image and an indicator of the class that each part belongs to, for example whether the identified part is a wrist, or hand or knee.

Figure 2:
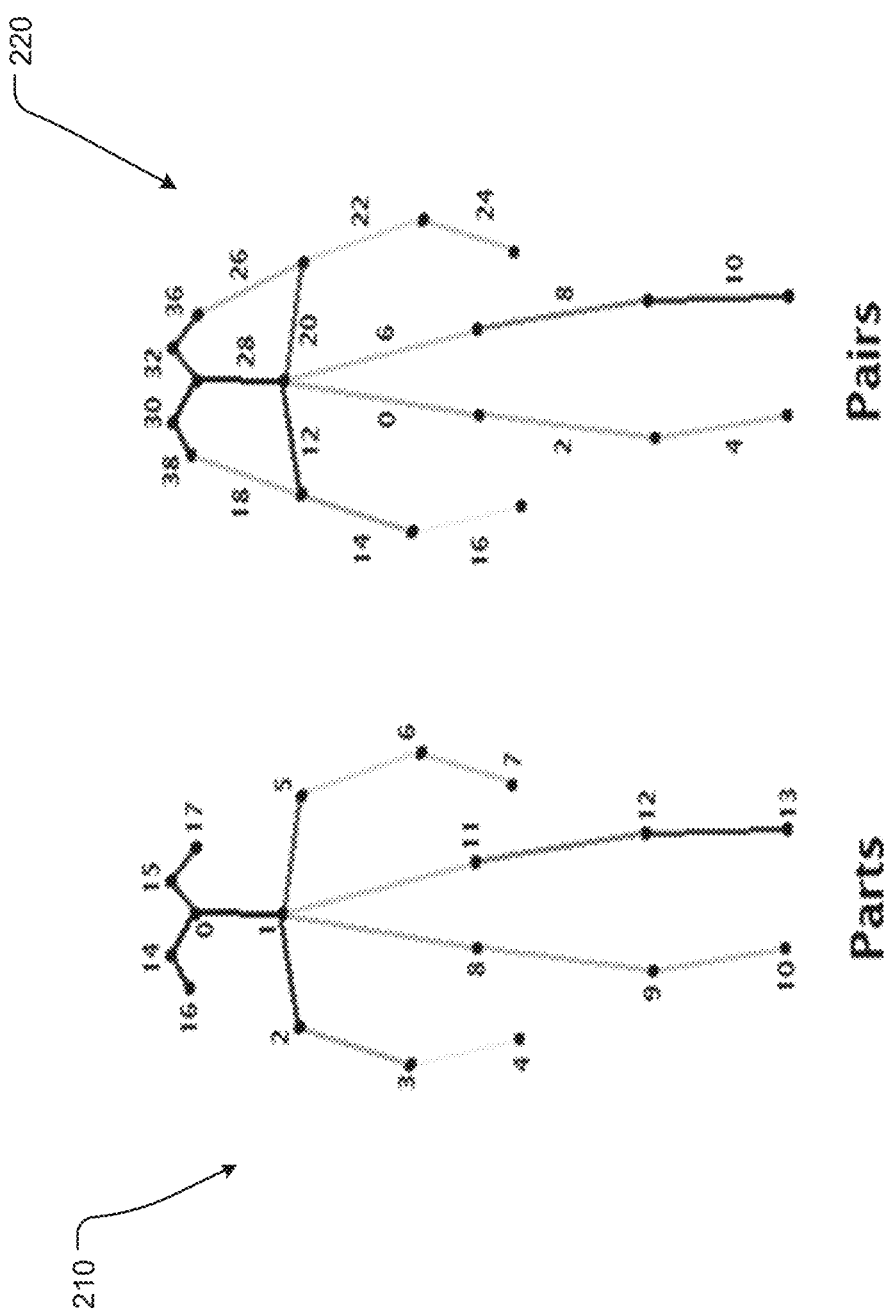
FIG. 2 is an image illustrating part of a method of pose estimation according to some embodiments.

FIG. 2 illustrates an example of a couple of images displaying the various key points notionally associated with various parts of a human body and determined by the pose estimation module 125. Image 210 illustrates various key points corresponding to specific parts of the human body. For example, key points 4 and 7 correspond to wrists, and key points 9 and 12 correspond to knees. Image 220 illustrates various limbs or parts of a human body model based on the key points of image 210. For example, points 16 and 24 correspond to the part between an elbow and a wrist of a person. The combination of the various key points or limbs or parts of the human body may be referred to as a skeletal model determined by the pose estimation module 125.

In some embodiments, the pose estimation module 125 may incorporate a pose analysis or estimation framework for pose estimation. The framework of the pose estimation module 125 may map pixels in a 2D image corresponding to a human to a 3D model of a surface of a human body. In some embodiments, the framework of the pose estimation module 125 may identify pixels in an image corresponding to a human and map each pixel to a 3D surface model of a human body. The framework of the pose estimation module 125 may enable the identification of a more complete representation of the posture of persons in an image. For example, the framework of the pose estimation module 125 may enable differentiation between pixels in an image corresponding to the palm of a person from pixels corresponding to the outer surface of the person's hand, thereby mapping the 2D image to a 3D surface model of a human body. Another example may include differentiation between a person's face and the back of a person's head. The framework of the pose estimation module 125 may utilize a trained Convolutional Neural Network to perform this task.

In some embodiments, the operation of the framework of pose estimation module 125 may be limited to the detection of only hands and heads of players to further improve the computational efficiency of the pose estimation processes. In some embodiments, the open source DensePose framework may be incorporated into the pose estimation module 125 to perform pose estimation. In some embodiments, the framework of pose estimation module 125 may be deployed using the Torchserve framework for deployment to allow for high-throughput pose estimation operations and scalable distributed execution using multiple processors, including multiple graphics processing units.

Figure 3:
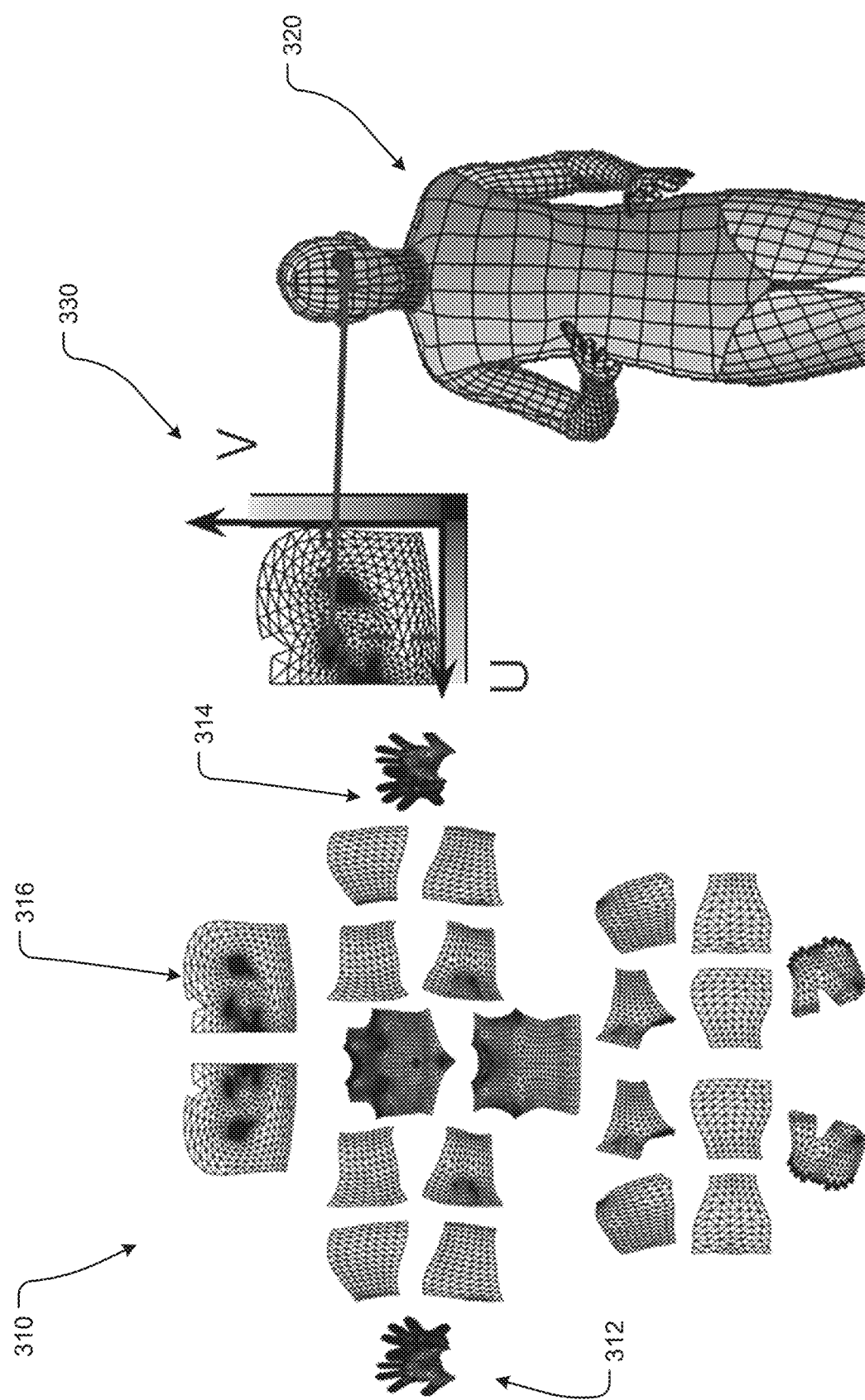
FIG. 3 is an image illustrating part of a method of pose estimation according to some embodiments.

FIG. 3 illustrates a 3D surface model of a human body in image 310, an example of the 3D surface model in a 2D representation in image 320 and an example of a mapping between the 3D surface model and the 2D image through image 330. The 3D surface model illustrated in image 310 comprises a human body broken down into several separate parts. For example, parts 312 and 314 in the image correspond to a 3D surface model of the extremity of the hand of a person including the palm and the outer surface of a hand. Part 316 corresponds to one side of a head. Each part is parameterized using a coordinate system as exemplified in mapping 330. The pose estimation module 125, through a pose estimation framework, may be capable of processing an image and identifying which 3D surface part a pixel in an image corresponds to in the 3D surface model of image 310. The output of the mapping of a pixel may include an identifier for the part, for example, left or right hand, or head; and the U and V coordinates (exemplified in 330) associated with the 3D surface model to which the pixel is mapped.

The pose estimation module 125 is trained on a training data set comprising several examples of images with individuals in chaotic environments with various parts of an individual's body being obfuscated by one or more other individuals in the image. For example, an individual seated at a table may obfuscate parts of an arm of an individual standing behind the seated individual. The training data set comprising images with multiple players in chaotic environments to allow the neural networks comprised in the pose estimation module 125 to model a chaotic gaming environment and generate accurate pose estimates in images of gaming environments with multiple players and partial obfuscation or blocking of players by each other.

In some embodiments, a large scale image dataset may be used for training the neural networks comprised in the pose estimation module 125. The large scale image dataset may be a large-scale object detection, segmentation, and captioning dataset. The dataset may comprise information regarding a wrist key point. In some embodiments, the COCO (Common Objects in Context) dataset may be used for training the neural networks comprised in the pose estimation module 125.

In some embodiments, the large scale image dataset may comprise a distal hand periphery key point in images within the dataset. The dataset may therefore be used to train the key point estimation neural network 152 to identify a pose of individuals in images, the identified pose comprising a skeletal model of players and distal hand periphery key points, for example. The dataset may be large and may include examples of images from different environments. The training dataset may enable training of a robust key point estimation neural network 152 suitable for application in chaotic, varied and fast-paced gaming environments.

The face recognition module 127 comprises program code to process images to identify regions in an image corresponding to a face. The face recognition module 127 may determine regions in an image corresponding to a face based on one or more key points corresponding to facial features (eyes, nose, mouth, cars, for example) determined by the pose estimation module 125. On identifying regions in an image corresponding to a face, the face recognition module 127 is configured to extract image features from the identified regions to enable face recognition. The face recognition module 127 may comprise one or more trained machine learning models to perform the image processing steps for face recognition.

In some embodiments, the face recognition module 127 may comprise deep neural networks, such as convolutional neural networks to perform face recognition. In some embodiments, the face recognition module 127 may incorporate a FaceNet framework for face recognition. Embodiments incorporating the FaceNet face recognition framework may comprise a neural network configured to process an image of a face to map the facial features into a Euclidean space to obtain an embedding representation of the facial features in an image. The neural networks trained to obtain the embedding representation may be trained using a triplet loss training principle. According to the triplet loss training principle, the loss or error during training is calculated using two positive examples and one negative example for each training dataset. A neural network trained using the triplet loss training principle generates embedding representations that are very close in Euclidean space for two different images of the same person however are distant from embedding representations of any other individual. The embedding representations are in the form of a vector in a feature space enabling comparison of the embedding representations with embedding representations of images of known individuals allowing recognition of faces in an image. In some embodiments, the embedding representations may be in the form of a 512 element vector.

In some embodiments, the gaming monitoring computing device 120 is configured to communicate with a gaming monitoring server 180 over a network 130. The gaming monitoring server 180 may provide central computing capability to system 100, enabling the centralized performance of one or more of the monitoring operations. For example, in some embodiments, the gaming monitoring server 180 may comprise or have access to a memory 184, in communication with a processor 182, the memory 184 comprising a facial feature and identity database 189. The gaming monitoring server 180 may be in communication with multiple (and possibly many) gaming monitoring devices 120 deployed in the gaming venue or in multiple gaming venues.

The facial feature and identity database 189 may comprise records of facial features of various known patrons of the gaming venue and the identity details of the various patrons. The records of the facial features of the known patrons may be in the form of an embedding representation suitable for comparison with the embedding representations generated by the face recognition module 127. The facial feature database 189 may in essence comprise images or other information providing a basis for comparison against the facial features recognised by the face recognition module 127. The facial feature database 189 or another database accessible to gaming monitoring server 180 may comprise or have access to information or identity details of the known patrons, such as names, official identification numbers, or addresses.

The game object association module 128 comprises program code that takes into account the outputs generated by each of the object detection module 123, the pose estimation module 125, the game object value estimation module 126, and the face recognition module 127 to identify a gaming event on a gaming table and associate the gaming event with an identity of the person participating in or initiating the gaming event. The game object association module 127 may receive information regarding game objects identified by the object detection module 123, a game object value estimated by the game object estimation module 126, and facial feature information of the person initiating or participating in the gaming event by the combination of outputs from the pose estimation module 125 and the face recognition module 127. The various steps performed by the game object association module 128 are identified in the flowchart of FIG. 6.

The game object estimation module 126 is configured to process images wherein at least one game object is detected by the object detection module 123 to estimate a game object value associated with the detected game objects. In some embodiments, the game object estimation module may comprise a height based game object estimation sub-module 154 configured to estimate the game object value based on a height of a stack of game objects and a colour of the game objects using any of the game object value estimation processes described in the PCT specification 'System and method for automated table game activity recognition' (publication number: WO/2017/197452), the contents of which is hereby incorporated by reference. In some embodiments, the game object estimation module may comprise a trained edge pattern recognition neural network configured to estimate the game object value based on a determined edge pattern of each game object as a stack of game objects using any of the game object value estimation processes described in the PCT specification 'System and method for machine learning driven object detection' (publication number WO/2019/068141), the contents of which am hereby incorporated by reference. The object detection module 123 may also be configured to determine a gaming table zone wherein the game objects are detected. For example, a gaming table for the game of baccarat comprises zones associated with players, bankers or a tie. The object detection module 123 may be configured with models of gaming table layouts which may be super imposed on images to determine which gaming table zone a game object is present in.

Figure 4:
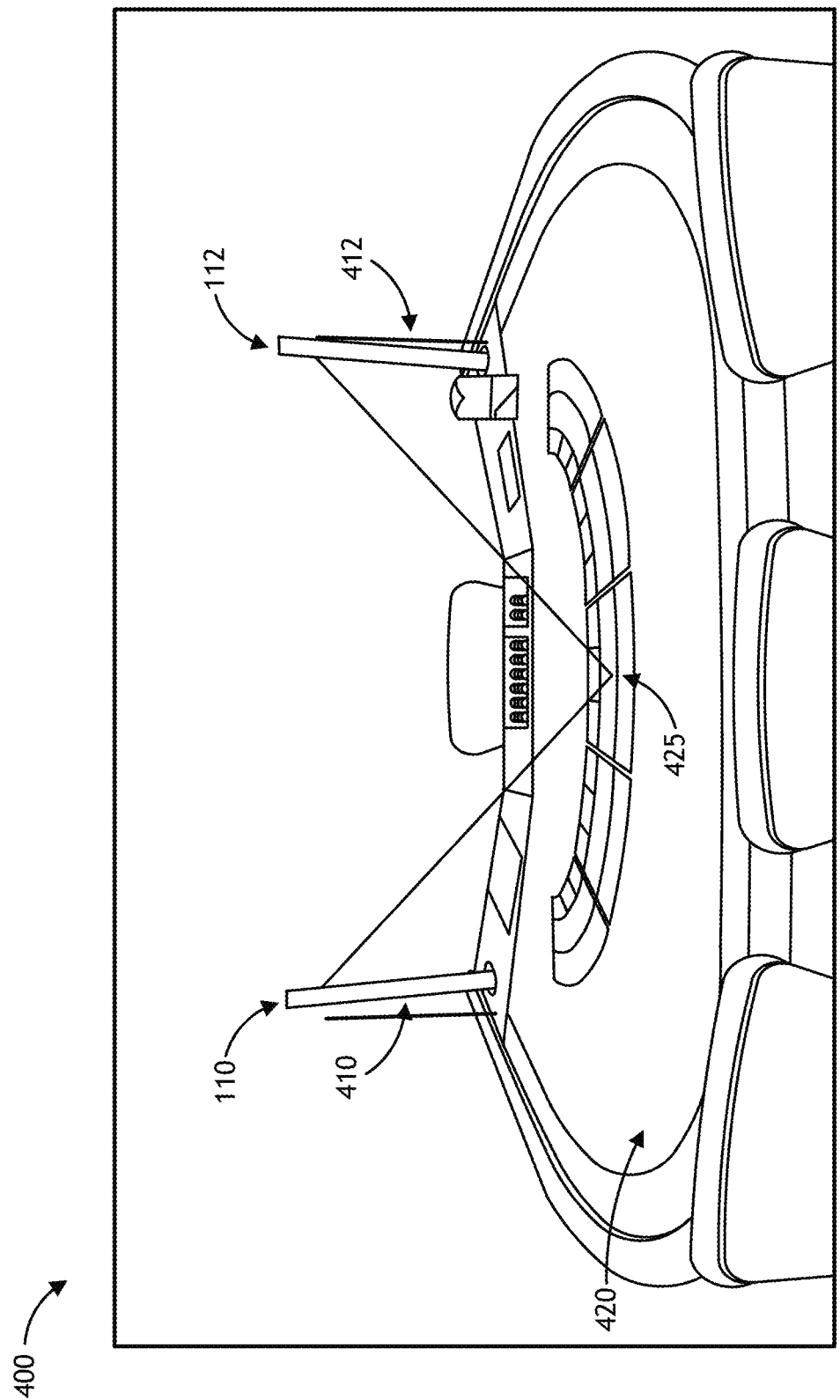
FIG. 4 is an image of an example gaming environment monitored by the gaming monitoring system of FIG. 1.

FIG. 4 illustrates a gaming environment 400 comprising cameras 110 and 112 to monitor gaming activity on a gaming table 420. The cameras 110 and 112 are embedded in posts 410 and 412 respectively. Posts 410 and 412 may be positioned on opposite lateral sides of a dealer's position on the table. The cameras 110 and 112 are so positioned to look away from a dealer's side of the table and towards the players participating in the game. The cameras 110 and 112 are so positioned to have an angle of view through apertures in posts 410, 412 that allows them to capture imagery of gaming activity on the gaming table 420 and the faces and postures of individuals participating in the gaming activity. In some embodiments, the cameras 110 and 112 may be positioned at a height in the range of 45 cm to 65 cm or 35 cm to 55 cm or 55 cm to 75 cm or 35 cm to 45 cm or 45 cm to 55 cm or 55 cm to 65 cm or 65 cm to 75 cm or 75 cm to 85 cm, for example from the gaming table 420. In some embodiments, the cameras 110 and 112 may be positioned at a distance of 130 cm to 150 cm or 120 cm to 140 cm or 140 cm to 160 cm or 160 cm to 180 cm, for example from a midpoint 425 of the gaming table. In some embodiments, more than two cameras may be used to monitor gaming activity. Additional cameras may be positioned on a dealer's side of the gaming table 420 and used to capture images from distinct angles allowing the cameras to cover a wider perspective over the gaming table 420. In some embodiments, the additional camera may be used to capture redundant images of the gaming area to enable verification of image processing results from multiple angles. The additional cameras may be configured to communicate wirelessly or through a wired connection to the gaming monitoring computing device 120.

The pose estimation module 125 of some embodiments may be configured to process an image of a person in the gaming environment and identify one or more key points associated with specific parts of the body of the person. In some embodiments, the pose estimation module 125 may be configured to determine a distal hand periphery key point of one or more players in an image. The distal hand periphery key point may be a pixel or set of adjacent pixels in an image corresponding to a pan of the hand of a player that is farthest front the player's wrist. Players may have their hands in various orientations and one or more fingers of the players may be bent in an image. The pose estimation module 125 of some embodiments is trained to determine which pixels or set of adjacent pixels in an image correspond to the farthest hand periphery of the player visible in the image. The determination of the distal hand periphery key point may be performed for both left and right hands.

Figure 5A:
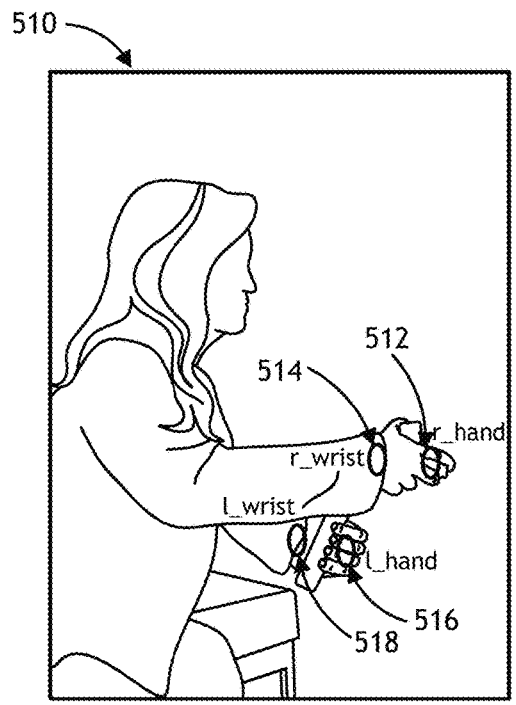
FIGS. 5A, 5B, 5C and 5D are images illustrating part of a method of pose estimation according to some embodiments.
Figure 5B:
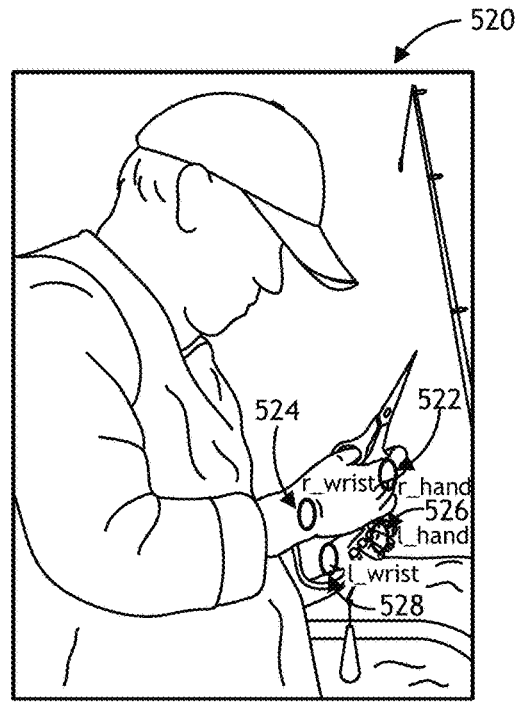
Figure 5C:
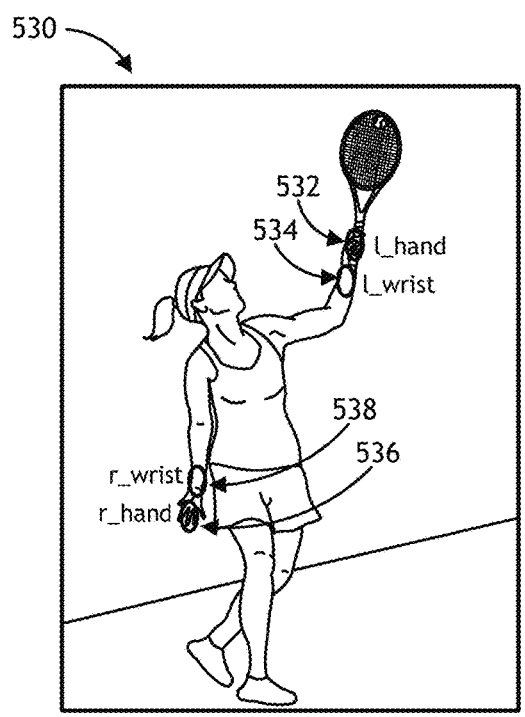
Figure 5D:
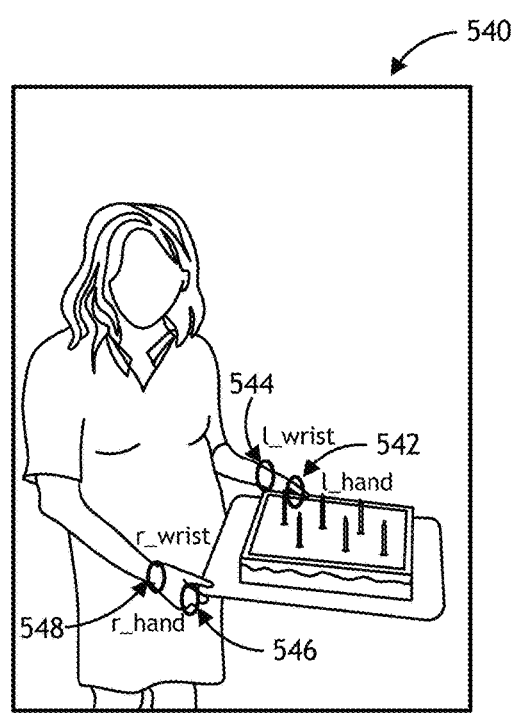

FIGS. 5A, 5B, 5C and 5D illustrate the determination of a wrist key point and a distal hand periphery key point of persons in the respective images. In FIG. 5A showing image 510, key points 514 and 518 corresponding to wrists and key points 512 and 516 corresponding to the distal hand periphery are determined by the pose estimation module 125. In FIG. 5B showing image 520, key points 524 and 528 corresponding to wrists and key points 522 and 526 corresponding to the distal hand periphery are determined by the pose estimation module 125. In FIG. 5C showing image 530, key points 534 and 538 corresponding to wrists and key points 532 and 536 corresponding to the distal hand periphery are determined by the pose estimation module 125. In FIG. 5D showing image 540, key points 544 and 548 corresponding to wrists and key points 542 and 546 corresponding to the distal hand periphery are determined by the pose estimation module 125. As is illustrated in FIGS. 5A to 5D, the pose estimation module 125 identifies the distal hand periphery irrespective of the angle at which the image was taken or the degree to which the person's fingers are curled or stretched. Identification of the distal hand periphery in a gaming environment provides an effective key point for allocating or associating a game object on a gaming table to a person or player responsible for placing the game object on the gaming surface.

Figure 6:
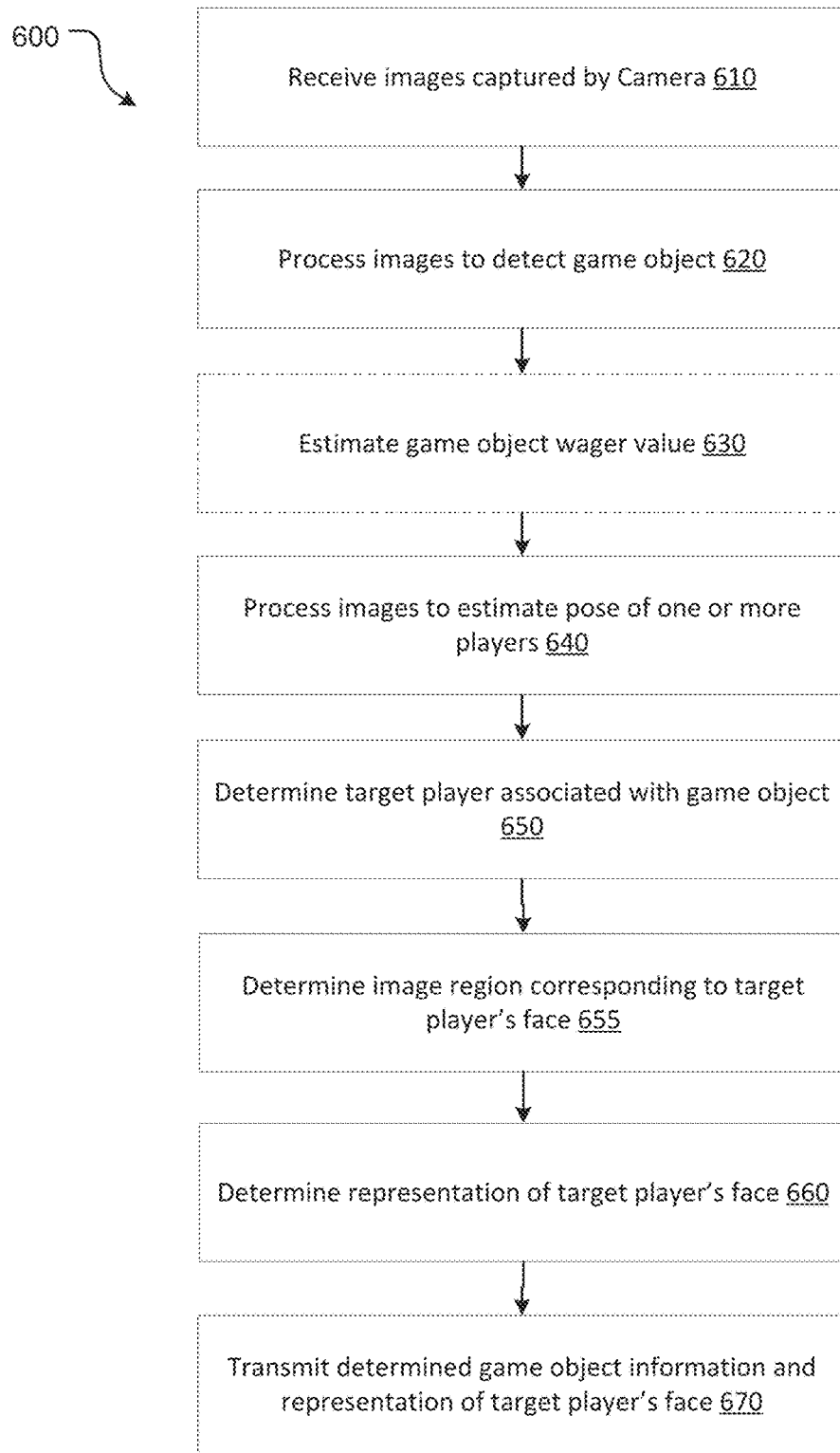
FIG. 6 is a flowchart of a method of gaming monitoring according to some embodiments.

FIG. 6 illustrates a flowchart of a process 600 performed by the gaming monitoring computing device 120 according to some embodiments. At 610, the gaming monitoring computing device 120 receives one or more images captured by camera 110. In embodiments with more than one camera, the computing device 120 may receive images from each camera simultaneously. The received image, may be in the form of a timestamped stream of images of the gaming environment, for example.

At 620, object detection module 123 processes the stream of images received at 610 to identify one or more game objects in a first image from the stream of images. The regions of the first image where the one or more game objects are identified may be identified by one or more coordinates or a bounding box around the identified game object. If a game object is detected in the first image, then at 630 the game object estimation module 126 estimates a game object value associated with the detected game object. The estimation of the game object value of the game object at 630 is an optional step and in some embodiments, the game object association module 128 may be configured to associate identified game objects with players without estimating a game object value of the identified game objects.

At 640, the pose estimation module processes the first image to determine a pose or posture of one or more players present in the first image. The determined pose may include one or more key points associated with various specific body parts of the players. The key points may include a key point associated with a distal hand periphery, including a left hand or right-hand periphery or both. Pose estimation may also include the estimation of a distinct skeletal model of the players. Identification of the distinct skeletal model may enable the association of a face region in the first image with a hand region of the same player. Since gaming environments may be quite chaotic, with several players crowding around a table and participating in a game at different points of time, estimation of the skeletal model of players allows the accurate association of face in an image with hands or a distal hand periphery identified in an image. The skeletal model may comprise an approximate and partial mapping of various body parts of a player with key points and segments associated with the various body parts. For example, the skeletal model may comprise key points associated with one or more of: a distal hand key point, wrist, elbow, shoulder, neck, nose, eyes, ears.

At 650, the game object association module 128 processes the pose or posture determined at 640 and the game objects detected at 620 to determine a target player associated with the game object. The target player is the player assumed to have placed the game object on the gaming table. The game object association module 128 estimates a distance between the game object identified at step 620 and each key point associated with a distal hand periphery. The estimated distance may be based on the coordinates of each key point associated with a distal hand periphery and the coordinates of the game object detected at 620 within the first image. Based on the calculated distances, the key point associated with a distal hand periphery closest to the game object may be considered to belong to the target player. Based on the distal hand periphery closest to the game object, the skeletal model of the target player may be determined.

Based on the skeletal model of the target player identified at 650, at 655 a region of the first image corresponding to a face of the target player may be determined. For example, key points corresponding to one or more of eyes, nose, mouth or ears may be used to extrapolate and determine a bounding box associated with the face of the target player. The skeletal model may allow the association of the distal hand periphery closest to the game object with the head or face region of the target player. In some embodiments, the person detection neural network 159 may determine bounding boxes (e.g. in the form of image coordinates) around faces of one or more players in an image and the skeletal model may allow the association of the face of the target player with the distal hand periphery closest to the game object.

In some embodiments, the face region of the image corresponding to the target player may be obfuscated or the target player may have turned around, showing only the back of the target player's head, for example. To address such situations, the object detection module 123 of some embodiments may be configured to track the region in the first image identified as a face region corresponding to the target player over the subsequent images in the stream of images received from the camera 110. The pose estimation module 125 may be configured to perform pose estimation on the subsequent images in the stream of images to determine the pose or posture of the target player. The determination of pose or posture of the target player may include a determination of whether the tracked face region of the target player corresponds to the target player's face or the back of the head. Based on the determination of the pose estimation module 125 over the subsequent images in the stream of images, the game object association module 128 may extract one or more image regions corresponding to the target player's face. In some embodiments, the game object association module 128 may extract image regions corresponding to the target player's face from 2 to 3 or 3 to 5 or 5 to 7 or 7 to 9 or 9 to 11 images from the stream of images, for example. The extraction of additional image regions corresponding to the target player's face may provide additional information regarding the facial features of the target player to improve the facial recognition process.

At 660, based on the one or more image regions corresponding to the target player's face extracted at 655, the facial recognition module may process the one or more image regions to obtain a vector representation or an embedding representation of the target player's face. The embedding representation of the target player's face incorporates information encoding distinct facial features of the player and allows comparison with a database of similarly encoded information of facial features.

At 670, the gaming monitoring computing device may transmit to the gaming monitoring server 180 the information regarding the determined gaming event and the target player. Information regarding the determined gaming event may include the nature of the gaming event, for example placement of a game object at an identified region of interest on a particular table. The game event information may include a unique identifier corresponding to the table and a region of the table where the gaming event occurred and a time stamp at which the gaming event occurred. The time stamp may include a date, time of the day and time zone information. The time of the day may include an hour and a minute information. In some embodiments, the time of the day may include an hour, a minute and a second information. Game event information may also include a game object value associated with the game event. Transmitted information regarding the target player may include the embedding representation of the target player's face determined at 660.

The process 600 may be implemented using a multi-threading computing architecture to perform real-time or near real time gaming monitoring. For example, for each game object detected at 620, the processor 122 may initialise a separate thread to perform the image processing tasks of steps 630 to 660, which allows parallel processing of the gaming monitoring processes for each detected game object. Over the course of monitoring by the process 600, as multiple game objects are detected at step 620, separate threads may be initialised to associate each game object with a target player. In some embodiments, a series of images captured by the camera 110 may be processed by each thread separately to track a target player over the series of images. Tracking the target player over the series of images allows the extraction of multiple images of the face of the target player. Multiple images of the face of the target player may be made available to the face embedding generation neural network 156 at step 660 to obtain a robust embedding representation of the target player.

Figure 7:
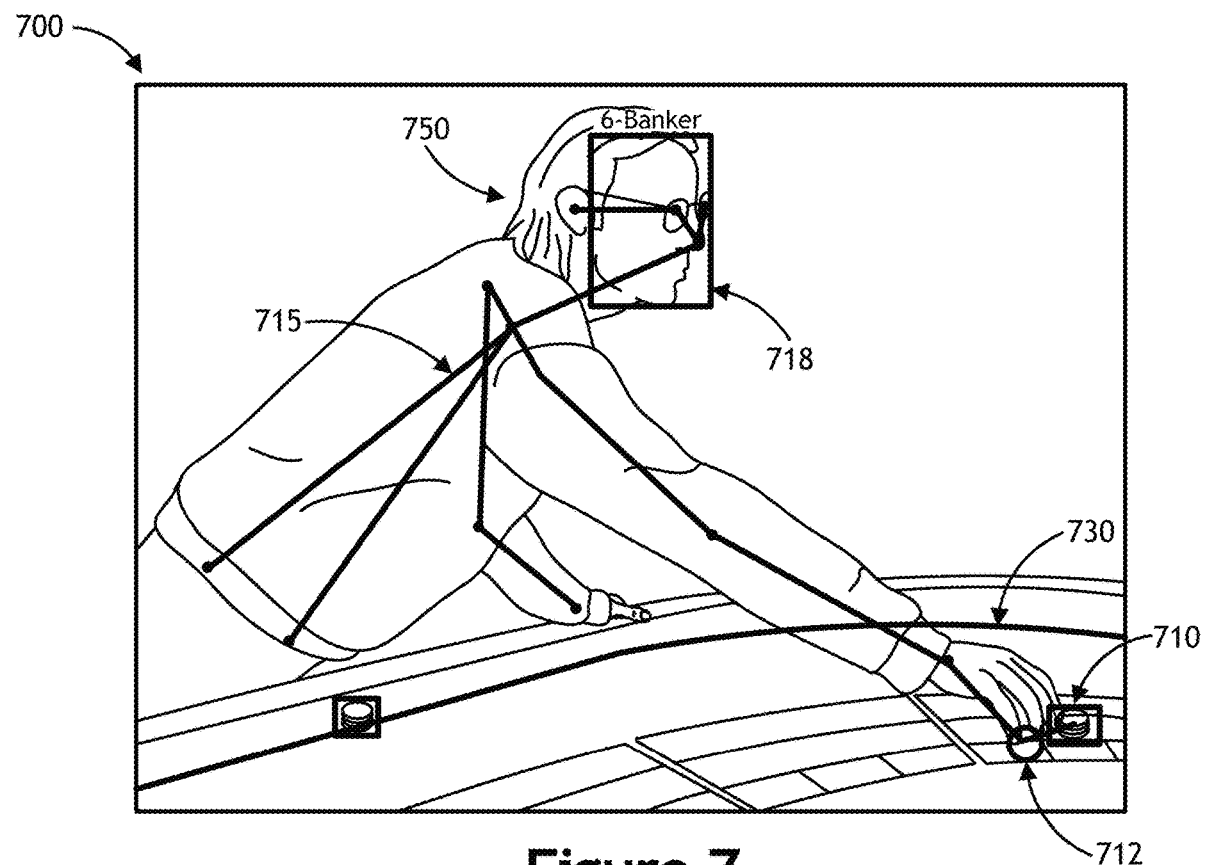
FIG. 7 is an image of an example gaming environment illustrating part of a method of gaming monitoring according to some embodiments.

FIG. 7 is an image 700 of a gaming environment illustrating part of a method of gaming monitoring according to some embodiments. In image 700, the pose estimation module 125 has determined a skeletal model 715 associated with a player 750. The determined skeletal model 715 comprises various key points associated with specific body parts of the player 750, for example joints of the player 750. The determined skeletal model 715 also comprises segments connecting the key points associated with specific body segments of the player 750. A distal hand key point 712 corresponds to a distal hand periphery of the player 750.

Also identified in image 700 is a bounding box 710 determined by the object detection module 123. The bounding box 710 identifies one or more game objects placed on the table surface 730. An image distance (in terms of image coordinates) between the key point 712 and the bounding box 710 is determined by the game object association module 128 to associate the game objects in the bounding box 710 with the skeletal model 715 of the player 750. In embodiments where multiple players are present, a distance between the key points corresponding to each player's distal-hand periphery and the bounding box 710 may be determined by the game object association module 128, and the distal hand key point 712 closest (in terms of image coordinates) to the bounding box 710 may be determined to correspond to the player 750 placing the one or more game objects in the bounding box 710 on the table surface 730. The distance may be calculated based on the (minimum) Cartesian distance between the pixels in image 700 corresponding to the distal hand key point 712 and the bounding box 710, for example.

FIG. 7 also illustrates a bounding box 718 identified by the person detection neural network 159 of the object detection module 123 around the face of the player 750. In some embodiments, the coordinates of the bounding box 718 may be determined by processing an image to extrapolate facial key points (key points corresponding to one or more of eyes, nose, mouth, ears of a person) determined by the key point estimation neural network 152. The identification of the skeletal model 715 allows the association of the distal hand key point 712 corresponding to the distal hand periphery of the player 750 with the bounding box 718 around the face of the player, thereby allowing the association of the one or more game objects in the bounding box 710 with the face of the player 750 in the bounding box 718.

Figure 8:
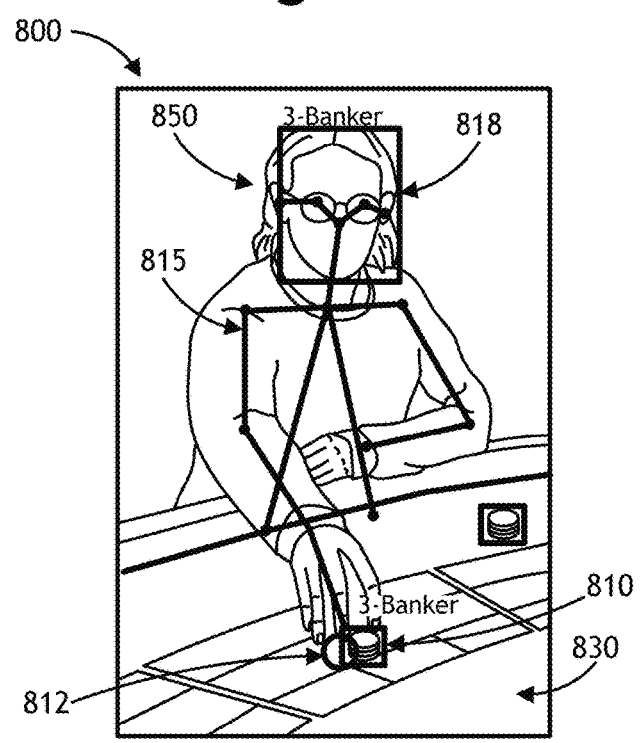
FIG. 8 is another image of an example gaming environment illustrating part of a method of gaming monitoring according to some embodiments.

FIG. 8 is an image 800 of a gaming environment illustrating part of a method of gaming monitoring according to some embodiments. In image 800, the pose estimation module 125 has determined a skeletal model 815 associated with a player 850. Unlike the player 750 of FIG. 7, the player 850 of FIG. 8 is seated at the gaming table. The determined skeletal model comprises various key points associated with specific body parts of the player 850, for example, joints of the player 850. The determined skeletal model also comprises segments connecting the key points associated with specific body segments of the player 850. A key point 812 corresponds to a distal hand periphery of the player 850.

Also identified in image 800 is a bounding box 810 determined by the object detection module 823. The bounding box 810 identifies one or more game objects placed on the table surface 830. A distance between the distal hand key point 812 and the bounding box 810 is determined by the game object association module 128 to associate the game objects in the bounding box 810 with the skeletal model 815 of the player 850. In embodiments where multiple players are present, a distance between the key points corresponding to each player's distal hand periphery and the bounding box 810 may be determined by the game object association module 128, and the distal hand key point 812 closest to the bounding box 810 may be determined to correspond to the player placing the one or more game objects at a location on table surface 830 corresponding to the bounding box 810.

FIG. 8 also illustrates a bounding box 818 identified by the person detection neural network 159 of the object detection module 123 around the face of the player 850. In some embodiments, the bounding box 818 may be determined by extrapolating facial key points (key points corresponding to one or more of eyes, nose, mouth, ears of a person) determined by the key point estimation neural network 152. The identification of the skeletal model 815 allows the association of the distal hand key point 812 corresponding to the distal hand periphery of the player 850 with the bounding box 818 around the face of the player, thereby allowing the association of the one or more game objects in the bounding box 810 with the face of the player 850 in the bounding box 818.

Figure 9:
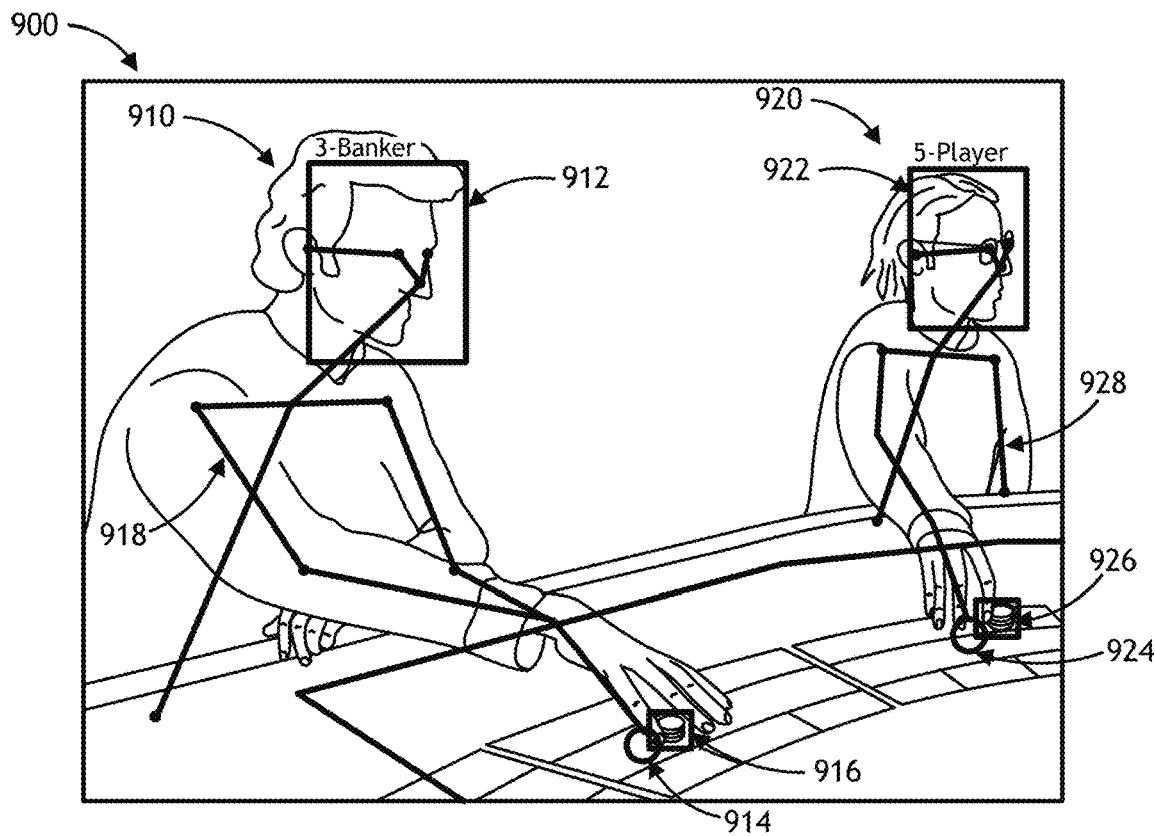
FIG. 9 is another image of an example gaming environment illustrating part of a method of gaming monitoring according to some embodiments.

FIG. 9 is an image 900 of a gaming environment illustrating part of a method of gaming monitoring according to some embodiments. Image 900 comprises a first player 910 and a second player 920. The pose estimation module 125 processes the image 900 to identify a first skeletal model 918 for the first player 910 and a second skeletal model 928 for the second player 920. The respective determined skeletal models comprise a first distal hand point 914 associated with the first player 910 and a second distal and point 924 associated with the second player 920. The object detection module 123 processes image 900 to determine bounding boxes 916 and 926 (in the form of image coordinates) around game objects placed on the game table.

The game object association module 128 may determine a relationship between the game objects in the bounding boxes 916 and 926 and the players 910 and 920 based on the minimum distance (in image coordinates) between the first distal hand point 914 associated with the first player 910 and the second distal and point 924 associated with the second player 920. Based on the distances determined by the game object association module 128, the game objects in bounding box 916 are associated with player 910 and the game objects in bounding box 926 are associated with player 920 by the game object association module 128. In some embodiments, the person detection neural network 159 of the object detection module 123 also processes image 900 to determine faces of the players and determine bounding boxes 912 and 922 around faces of player 910 and 920 respectively. In some embodiments, the bounding boxes 912 and 922 may be determined by extrapolating facial key points (key points corresponding to one or more of eyes, nose, mouth, cars of a person) determined by the key point estimation neural network 152.

Figure 10:
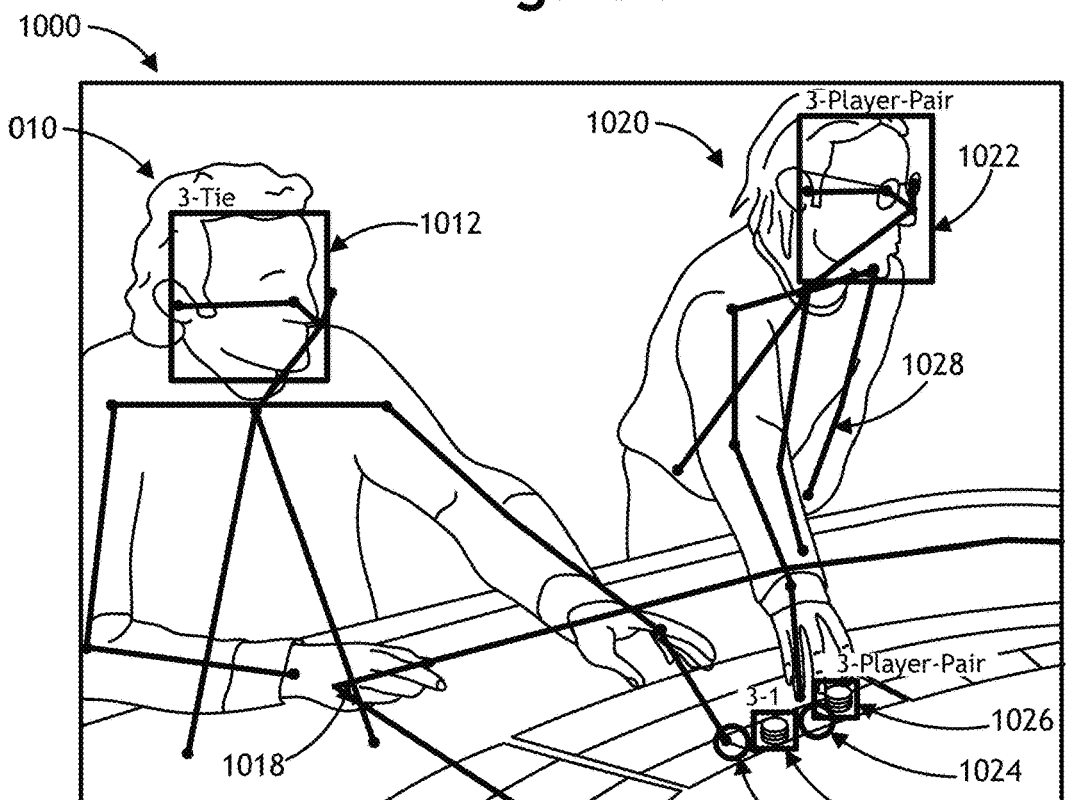
FIG. 10 is another image of an example gaming environment illustrating part of a method of gaming monitoring according to some embodiments.

FIG. 10 is an image 1000 of a gaming environment illustrating part of a method of gaming monitoring according to some embodiments. Image 1000 comprises a first player 1010 and a second player 1020. Unlike the players 910 and 920 of FIG. 9, the hands of players 1010 and 1020 of FIG. 10 are significantly closer to each other. The pose estimation module 125 processes the image 1000 to identify a first skeletal model 1018 for the first player 1010 and a second skeletal model 1028 for the second player 1020. The respective determined skeletal models comprise a first distal hand point 1014 associated with the first player 1010 and a second distal and point 1024 associated with the second player 1020. The object detection module 123 processes image 1000 to determine bounding boxes 1016 and 1026 around game objects placed on the game table.

The game object association module 128 may determine a relationship between the game objects in the bounding boxes 1016 and 1026 and the players 1010 and 1020 based on the minimum distance (in image coordinates) between the first distal hand point 1014 associated with the first player 1010 and the second distal hand point 1024 associated with the second player 1020. Based on the distances determined by the game object association module 128, the game objects in bounding box 1016 are associated with player 1010 and the game objects in bounding box 1026 are associated with player 1020 by the game object association module 128. In some embodiments, the person detection neural network 159 of the object detection module 123 also processes image 1000 to determine faces of the players and determines bounding boxes 1012 and 1022 around faces of player 1010 and 1020 respectively. In some embodiments, the bounding boxes 1012 and 1022 may be determined by extrapolating facial key points (key points corresponding to one or more of eyes, nose, mouth, ears of a person) determined by the key point estimation neural network 152.

As illustrated in image 1000, even if players are positioned close to each other with their limbs or body parts potentially overlapping, the embodiments am capable of associating game objects with players based on the image processing techniques described.

Figure 11:
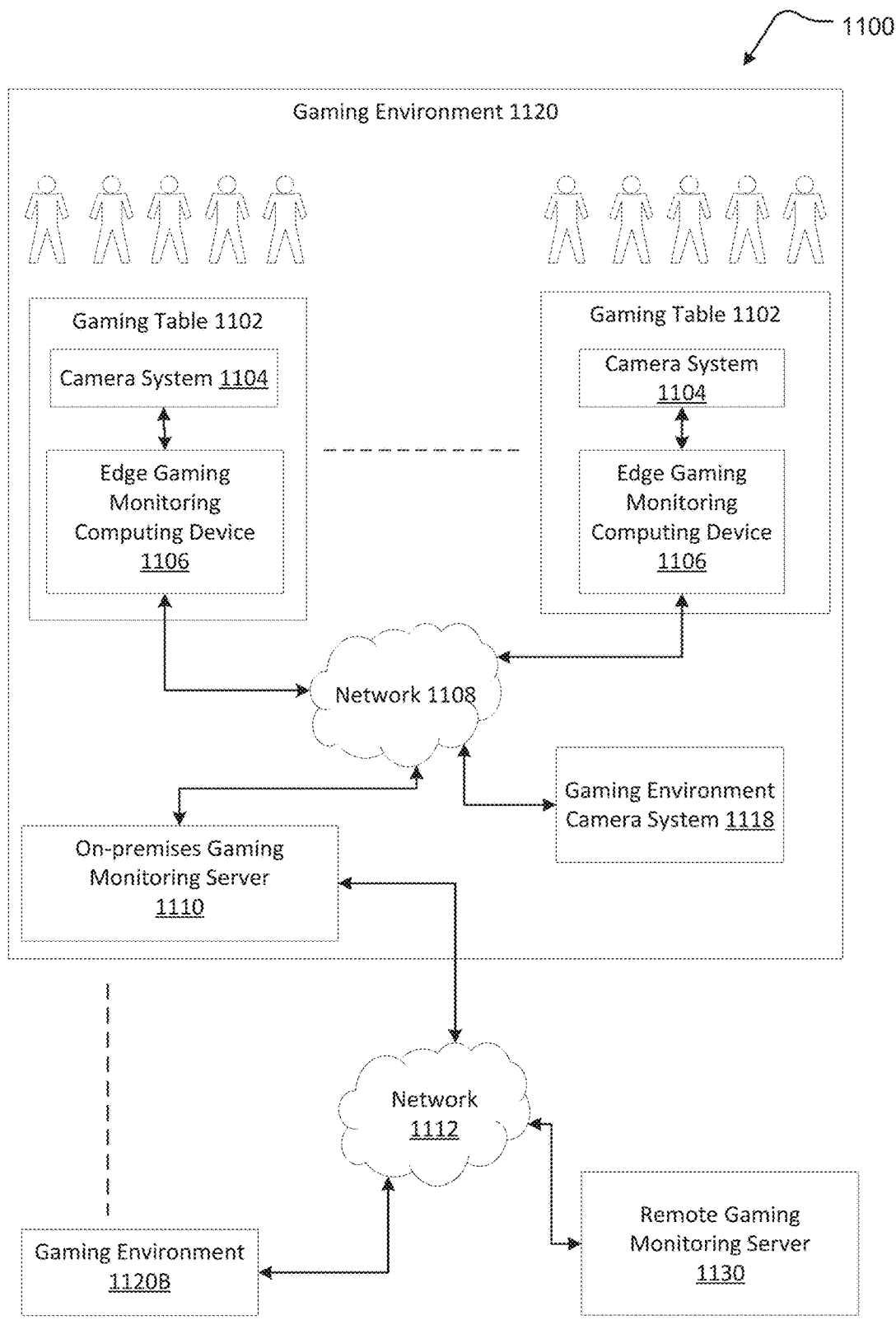
FIG. 11 is a block diagram of a gaming monitoring system according to some embodiments.

FIG. 11 is a block diagram of a gaming monitoring system 1100 according to some embodiments. The gaming monitoring system 1100 comprises computing and networking components located in, or in proximity to, a gaming environment 1120. The gaming monitoring system 1100 also comprises computing and networking components located remote to the gaming environment 1120. The gaming environment 1120 may include a venue where gaming monitoring may be performed, such as a gaming venue or a casino, for example.

The gaming monitoring system 1100 comprises a camera system 1104 in communication with a computing device or an edge gaming monitoring computing device 1106. In some embodiments, the edge gaming monitoring computing device 1106 may be a computing device configured to perform low latency operations or low latency image processing operations on the image data received from the camera system 1104. The camera system 1104 and edge gaming monitoring computing device 1106 may be designated to a particular area or zone in the gaming environment 1120. The particular area or zone of the gaming environment 1120 may be or include a particular table or a group of tables located in close proximity, for example. The combination of the camera system 1104 and edge gaming monitoring computing device 1106 may be replicated through various areas or regions or zones of the gaming environment 1120.

In some embodiments, the camera system 1104 and the edge gaming monitoring device 1106 may be implemented as a unitary smart camera or a machine vision system that combines the capability of capturing images and processing image data by performing part or all of the processing operations of the edge gaming monitoring computing device 1106 within the unitary smart camera or the machine vision system.

In some embodiments, at least a part of the camera system 1104 and the edge gaming monitoring computing device 1106 may be implemented using a smartphone comprising a camera to capture images of the gaming environment. In some embodiments, the camera system 1104 may comprise a depth of field camera or a motion sensing camera or a time of flight camera or a 3D camera or a range imaging camera to capture depth related information associated with a line of sight of the camera system 1104. Depth of field images captured using the 3D camera of the camera system 1104 may comprise information regarding a relative or absolute distance between the camera system 1104 and the various objects in view of the camera system 1104. In some embodiments, the object detection module 123, or the face recognition module 127, or the pose estimation module 125 or the game object value estimation module 126 or the game object association module 128 or the face orientation determination module 1289 may perform the various image processing tasks based on a combination of the visual image data and depth of field image data captured by the camera system 1104. For example, the object detection module 123 may perform image segmentation operations as part of the object detection process. The image segmentation process may comprise segmenting an image into distinct segments, wherein each segment corresponds to a potential object of interest or a background. The image segmentation operations may include analysing the depth of field image data to perform at least a part of the image segmentation operation based on the depth of field information captured by the 3D camera of the camera system 1104. For example, patrons when seated at or standing near a gaming table may be distinguished from the background of an image based on the depth information associated with the portion of the images corresponding to the patrons. Using the depth of field information, an image may be segmented to identify portions of an image corresponding to a gaining table or patrons seated at or standing near a gaming table.

Each edge gaming monitoring computing device 1106 is configured to communicate with an on-premises gaming monitoring server 1110 over a network 1108. Network 1108 may be a local computer communications network deployed in the gaming environment 1120. Network 1108 may include a local area network (LAN) deployed using a combination of routers and/or switches, for example. The on-premises gaming monitoring server 1110 may be deployed in a secure part of the gaming environment 1120 to receive and process information or data from each of the edge gaming monitoring devices 1106. The on-premises gaming monitoring server 1110 is configured to communicate with a remote gaming monitoring server 1130 over a network 1112. The network 1112 may comprise a wide area network such as the internet, over which the remote gaming monitoring server 1130 and the on-premises gaming monitoring server 1110 may communicate.

A significant volume of image data is continuously captured by the camera system 1104. Each camera system 1104 may generate image data from captured images at the rate of 1-20 MB/s or more than 1 MB/s, for example. A gaming environment 1120 may be particularly large with 100 or more gaming tables 1102 or gaming zones or areas that need to be monitored. Accordingly, a significant volume of data may be generated at a rapid rate that may require efficient and quick processing to support the monitoring operations. The gaming monitoring system 1100 adopts the approach of distributing the processing of the image data recorded by each camera system 1104 hierarchically using the combination of the edge gaming monitoring device 1106, on-premises gaming monitoring server 1110 and the remote gaming monitoring server 1130. The hierarchical distribution of the image processing and analysis operations allows gaming monitoring system 1110 to handle the significant volume and velocity of image data while enabling the required gaming monitoring inferences to be generated in near-real-time to respond to incidents or events in that gaming environment 1120 that may require immediate attention.

The camera system 1104 may comprise at least one camera directed towards a direction where the activities of patrons gaming on the gaming table 1102 are visible. In some embodiments, the camera system 1104 may comprise two or more cameras to sufficiently cover various angles around the gaming table 1102 to adequately capture images of gaming activity of patrons and their faces. In some embodiments, the camera system 1104 may comprise at least one panoramic camera configured to capture images at a capture angle of 180 degrees or greater than 180 degrees. Some embodiments may incorporate a Mobotix™ S16 DualFlex camera or a Jabra™ PanaCast camera, for example. Each camera of the camera system 110 may continuously capture images at a resolution of 6144×2048 pixels or 3840×2160 pixels or 2592×1944 pixels or 2048× 1536 pixels or 1920×1080 pixels or 1280×960, for example. These listed image resolution examples are non-limiting and other imaging resolutions may be incorporated by the embodiments to perform gaming activity monitoring.

The on-premise gaming monitoring server 1110 may comprise a secure data storage module or component 1291 provided as part of memory 1284. The secure data storage module 1291 may be configured to store data received from the edge computing device 1106 or data generated as part of the image processing operations performed by the gaming monitoring server 1110. Since data received from the edge computing device 1106 or data generated as part of the image processing operations performed by the gaming monitoring server 1110 may relate to sensitive personal information, the data stored in the secure data storage module 1291 may be encrypted to protect the data from information security breaches. The physical location where the on-premise gaming monitoring server 1110 may also be physically secured such as by placement in a locked environment accessible only to authorised personnel. In some embodiments, the remote gaming monitoring server 1130 may also comprise an equivalent secure data storage module to store data or information received from the on-premises gaming monitoring server 1110. In some embodiments, the edge computing device 1106 may be configured to automatically delete image data received from the camera system 1104 after the image data is processed.

Figure 12:
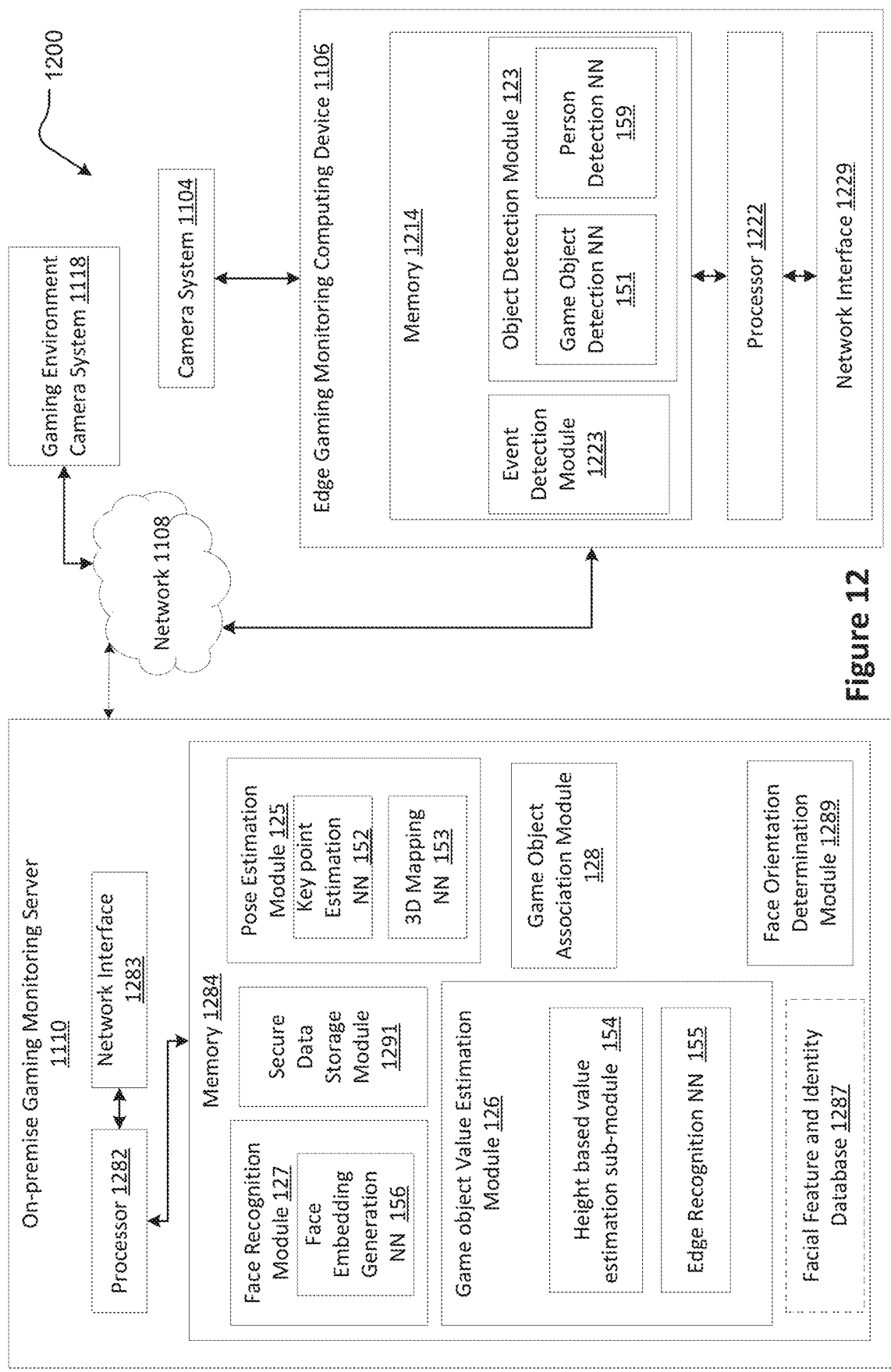
FIG. 12 is a block diagram of a part of the gaming monitoring system of FIG. 11 according to some embodiments.

FIG. 12 is a block diagram of a subset of system components 1200 of the gaming monitoring system 1100 of FIG. 11. FIG. 12 illustrates the components of the on-premises gaming monitoring server 1110 and the edge gaming monitoring computing device 1106 in greater detail. The edge gaming monitoring computing device 1106 comprises at least one processor 1222 in communication with memory 1214 and a network interface 1229. Memory 1214 comprises program code to implement an object detection module 123 and an event detection module 1223. Object detection module 123 has been described with reference to the gaming monitoring computing device 120 of FIG. 1. The program code of the object detection module 123 allows the edge gaming monitoring computing device 1106 to process images captured by camera system 1104 and perform object detection operations on the captured images. As described with reference to the gaming monitoring computing device 120 of FIG. 1, the object detection operations on the captured images performed by the object detection module 123 may include detection of game objects by the game object detection neural network 151. Game objects may include chips, playing cards, or cash. A game object may be detected by the object detection module 123 when the part or whole of the game object come in view of the camera system 1104. A game object may come in view of the camera system 1104 when the game object may be placed on the gaming table 1102. The person detection neural network 159 may similarly detect image regions corresponding to persons or part of a person in the images captured by the camera system 1104.

The object detection module 123 may continuously process the images captured by the camera system 1104 to generate a stream of object detection data comprising data packets with information or data regarding the detected objects. Each data packet in the stream of object detection data may correspond to object data in one or more image frames captured by the camera system 1104 and may have a timestamp comprising date and time information associated with the date and time at which the image frames were captured by the camera system 1104. The time information may include time information in a 24 hr HH:MM:SS format, for example. Each data packet in the stream of object detection data may also comprise a list or series of object information relating to objects detected in the one or more image frames. The object information may include a class identifier or a label identifying the kind of object detected. The class or label may refer to a person or a part of a person (for example face or hand of a person), or a game object or cash, for example. The object information may also include one or more attributes associated with the detected object, such as coordinates in the captured image associated with the detected object, or coordinates defining a bounding box around an image region corresponding to the detected object, for example. The one or more attributes may also include a unique identifier associated with the detected objects to uniquely identify each detected object. The one or more attributes may also include a zone or region identifier of the gaming 1102 that a detected game object is placed at the point in time it was detected by the object detection module 123.

The event detection module 1223 may comprise program code defining logical or mathematical operations to process the object detection data generated by the object detection module 123 to identify the occurrence of events. Based on the identified events, the event detection module 1223 may transmit to the on-premises gaming monitoring server 1110 data relating to the identified event for further analysis. The transmitted data relating to the identified events may include the various attributes or labels associated with the detected objects. The transmitted data relating to the identified events may also include image data corresponding to part or whole of the images captured by the camera system 1104 related to the objects detected by the object detection module 123 that related to the identified event.

Program code of the event detection module 1223 may define a plurality of event triggers or triggers. Each trigger may comprise a set of conditions or parameters that could be evaluated to determine the occurrence or non-occurrence of an event based on the data received by the event detection module 1223. The event detection module 1223 may identify events based on the object detection data and the various attributes and information comprised in the object detection data. Detection of a new previously unseen in the images captured by the camera system 1104) game object in the images captured by the camera system 1104 is an example of an event. The condition of detection of a new (previously unseen in the images captured by the camera system 1104) game object in the images captured by the camera system 1104 may be defined as a trigger in the event detection module 1223 for detection of an event or a gaming event, for example. The detection of a new game object may correspond to a real-world event of a patron placing a game object on the gaming table 1102 during the course of gameplay, for example. Detection of a new (previously unseen in the images captured by the camera system 1104) person or a new face in the images captured by the camera system 1104 is another example of an event. The condition of detection of a new person or face (previously unseen in the images captured by the camera system 1104) in the images captured by the camera system 1104 may be defined as another trigger in the event detection module 1223 for detection of an event or a gaming event, for example.

In some embodiments, the edge gaming monitoring computing device 1106 may be implemented using a low computing power computing device, for example using a NVIDIA Jetson Xavier NX or a NVIDIA Jetson Nano based system-on-module. The edge gaming monitoring computing device 1106 may be implemented using a computing device that consumes less power, generates less heat and is less expensive due to lower computational power requirements, for example. Use of a less expensive computing device as the edge gaming monitoring computing device 1106 allows the gaming monitoring system 1100 to be inexpensively scaled by deploying many multiples, such as 100s or 1000s, of edge gaming monitoring computing devices 1106 in the gaming environment 1120.

The on-premise gaming monitoring server 1110 comprises at least one processor 1282 in communication with a network interface 1283 and memory 1284. Memory 1284 comprises several modules or components described with reference to the gaming monitoring device 120 of FIG. 1, including face recognition module 127, pose estimation module 125, game object value estimation module 126, game object association module 128 and facial feature identity database 189. Unlike the gaming monitoring computing device 120 of FIG. 1 that receives data directly from camera 110, the on-premise gaming monitoring server 1110 receives processed data from the edge gaming monitoring computing device 1106. The various code modules of the on-premise gaming monitoring server 1110 perform face recognition, pose estimation, game object value estimation, game object association operation, on the processed data received from the edge gaming monitoring computing device 1106.

The on-premise gaming monitoring server 1110 may comprise a face orientation determination module 1289. The face orientation determination module 1289 comprises program code to process image data relating to images of faces captured by the camera system 1104 and detected by the object detection module 123 of the edge gaming monitoring computing device 1106. The face orientation determination module 1289 determines orientation information of a face in image data corresponding to a face.

As a patron participates in gameplay in the gaming environment 1120, due to the natural movement of the patron's face, the camera system 1104 may capture images of the patron's face from various angles. The object detection module 123 may detect a face in an image captured by the camera system 1104 and may transmit to the on-premise gaming monitoring server 1110 image data of regions of the captured images corresponding to the face of a patron.

Some captured images may comprise a more head-on or front-on or straight-on snapshot of the patron's face captured when the patron is looking more directly towards one or more cameras of the camera system 1104. A more head-on or front-on or straight-on snapshot of the patron's face may be an image capturing at-least both eye regions of the patron, for example. Alternatively, a more head-on or front-on or straight-on snapshot of the patron's face may be an image capturing a greater surface area of the patron's face, thereby being more information rich for facial recognition purposes.

Some captured images may comprise a more side-on snapshot of the patron captured when the patron is not looking more directly towards one or more cameras of the camera system 1104. The more side-on snapshot of the patron may be an image capturing only one eye region of the patron, for example. Alternatively, the side-on snapshot of the patron may be an image capturing a smaller surface area of the patron's face, thereby being information poor and thus less suitable for facial recognition purposes.

The more head-on images of the face of a patron may be more effective and efficient for performing facial recognition operation by the face recognition module 127. The program code of the face orientation determination module 1289 processes image data corresponding to faces to identify landmarks in the image corresponding to specific points in the face. The specific points in the face may include points corresponding to various parts of the eye, mouth, nose, eyebrow, chin, for example.

The face orientation determination module 1289 may also determine 3D coordinates corresponding to each identified landmark. Based on the 3D coordinates of each identified landmark, an orientation of a face may be determined. The determined orientation may be represented in the form of a rotation matrix, or using Euler's angles, or using quaternions (a scaler component and a three-dimensional vector component) or using a multi-dimensional vector representation encoding the orientation of the detected face.

Using the representation of the orientation of the detected face, a more head-on face image of a patron may be selected from multiple images of the face of the patron. The selection of a more head-on face image improves the accuracy of the face recognition module 127 and the efficiency of the face recognition processes. A more head-on face image comprises greater data regarding distinctive facial features of a patron and therefore it provides a more effective starting point for more accurate and efficient facial recognition operations. Discarding the less head-on images of faces of patrons also allows the on-premise gaming monitoring server to not perform computationally expensive face recognition operations on images with less information regarding facial features.

In some embodiments, the face orientation determination module 1289 may comprise a deep neural network trained to process images of faces and identify facial landmarks and 3D coordinates associated with each facial landmark. The deep neural network may be trained using the 300 W-LP dataset or the 300-VW dataset, for example. The deep neural network of the face orientation determination module 1289 may comprise a face alignment network (FAN). The FAN may comprise one or more stacked hourglass networks described in the paper 'Stacked Hourglass Networks for Human Pose Estimation' by Newell et al. published by the European Conference on Computer Vision in 2016. The FAN may comprise one or more bottleneck networks or layers described in the paper 'Binarized Convolutional Landmark Localizers for Human Pose Estimation and Face Alignment with Limited Resources' by Bulat et al published by the International Conference on Computer Vision in 2017. In some embodiments, the face orientation determination may be performed using the techniques described in the paper 'How far are we from solving the 2D & 3D Face Alignment problem?' by Bulat et al. published by the International Conference on Computer Vision in 2017.

In some embodiments, the on-premise gaming monitoring server 1110 may include a facial feature and identity database 1287. Similar to the facial feature and identity database 189 described with reference to FIG. 1, the facial feature and identity database 1287 may comprise records of facial features of various known patrons of the gaming venue and the identity details of the various know patrons. The records of the facial features of the known patrons may be in the form of an embedding representation suitable for comparison with the embedding representations generated by the face recognition module 127. The facial feature database 1287 may in essence comprise images or other information providing a basis for comparison against the facial features recognised by the face recognition module 127. The facial feature database 1287 or another database accessible to on-premise gaming monitoring server 1110 may comprise or have access to information or identity details of the known patrons, such as names, official identification numbers, or addresses. In some embodiments, remote gaming monitoring server 1130 may comprise the facial feature database 1287 and may perform a comparison based on the facial feature data transmitted by the on-premises gaming monitoring server 1110.

FIG. 12 illustrates one example of allocation or deployment of the various processing modules and/or computing resources between the edge computing device 1106 and the on-premises server 1110. The allocation or distribution of the modules between the edge computing device 1106 and the on-premises server 1110 may be varied in other embodiments in response to different constraints or objectives of the gaming monitoring system 1100. For example, in some embodiments, the various processing modules (123, 1223, 125, 125, 127, 1291, 128, 189, 1289) illustrated in FIG. 12 may be deployed across the edge computing device 1106, the on-premises gaming monitoring server 1110 and the remote gaming monitoring server 1130. The different constraints or objectives governing the allocation or deployment of the various processing modules may include: constraints related to handling the data volume generated by the camera systems 1104, constraints related to memory buffer capacity across the various computing components of the gaming monitoring system 1100, constraints related to the latency requirements of the monitoring operations of the gaming monitoring system, constraints associated with the physical security and data security of the various computing components of the gaming monitoring system 1100, and constraints associated with the data link capacity between the various components of the gaming monitoring system 1100. The on-premises server 1110 and the remote gaming monitoring server 1130 and any computing devices of the gamin monitoring system 1100 apart from the edge computing device 1106 may be collectively referred to as upstream computing devices.

In some embodiments, parts of the image processing operations performed by the edge computing device 1106 may be performed by the on-premises gaming monitoring server 1110. In some embodiments, parts of the image processing operations performed by the on-premises gaming monitoring server 1110 may be performed by the edge computing device 1106. In some embodiments, parts of the image processing operations performed by the on-premises gaming monitoring server 1110 may be performed by the remote gaming monitoring server 1130.

FIG. 13 illustrates a flowchart of a method 1300 performed by the edge gaming monitoring device 1106, according to some embodiments. At 1310, the edge gaming monitoring device 1106 receives image or image data of images captured by the camera system 1104. The image or image data may be received at a rate of 2 to 10 frames per second or 10 to 20 frames per second, or 10 to 30 frames per second, or 10 to 60 frames per second, or 10 to 120 frames per second, for example. A frame rate of the camera system 1104 may be configured to strike a balance between computational time required to process each frame with the need for capturing image frames in close time proximity to capture images of all or most of the events occurring in the gaming environment.

At 1320, the object detection module 123 of the edge gaming monitoring device 1106 processes the images received at 1310 to perform object detection. As described with reference to the object detection module 123, object detection may include detection of one or more game objects or persons in the images received at 1310. The process of object detection may include the identification of image segments in the images, each image segment corresponding to an identified object. Multiple image segments may be identified in each image and the multiple image segments may overlap with each other. In some embodiments, object detection may be limited to the detection of game objects such as chips.

At optional step 1330, the object detected at 1320 is tracked over a plurality of image frames received from the camera system 1104. The tracking may occur over 2 to 10 image frames received from the camera system 1104, for example. In embodiments, where object detection at step 1320 is limited to the detection of game objects, the optional step of tracking the detected game object may be performed. The game object may be initially held in the hand of a player before being placed on the gaming table 1102. While a game object is held in the hand of a player, it may be detected at step 1320. Performing the optional step of tracking the detected object over a plurality of image frames provides greater certainty that the detected object is being used as part of the course of gameplay on the gaming table 1102. In circumstances, where a game object may be initially detected (for example when presented in the hand of a player) but not tracked over a plurality of image frames (for example, if the player withdraws the game object from view), then the event detection module 1223 at step 1340 may make a determination that an event associated with the initially detected game object has not occurred.

At 1340, the event detection module 1223 processes the data generated regarding object detection at step 1320 and object tracking at step 1330 to determine whether an event, such as a gaming event has occurred. The event may be for example placement of a game object by a player on the gaming table 1102. The occurrence of an event may be determined based on successfully tracking the game object detected at 1320 over a plurality of image frames, for example. Based on the determined event, the event detection module 1223 may prepare an event data packet or event data for further analysis by the on-premise gaming monitoring server 1110.

The event data packet may include image regions or image segments corresponding to the detected objects at step 1320, including image regions or segments corresponding to game objects and image regions corresponding to persons detected in the images captured by the camera system 1104. The event data packet may also include any specific attributes relating to the objects detected by the object detection module 123. The specific attributes may include a class or label identifier associated with the detected objects identifying a category of the detected object. The specific attributes in relation to game objects may include a label or identifier associated with a region of the gaming table 1102 where that particular game object may have been detected. For example, for a gaming table 102 for a game of baccarat, the gaming table 1102 may have for example 10 regions, each region being associated with one or more potential players. Each region may have three subregions: a banker region, a player region, and a tie region. One of the attributes associated with a detected game object may include a region identifier and a sub-region identifier indicating in which part of the gaming table 1102 the game object was detected. In some embodiments, the event data may include coordinates defining a rectangle in relation to the detected game objects in the image received at 1310 or a portion or part of the image received at 1310. In some embodiments, the event data may include a timestamp associated with an image received at 1310 comprising the object detect at 1320. The timestamp may comprise time and date information and the timestamp data may be indicative of the time of an occurrence of the relevant event.

At 1350, the event data packet prepared at step 1340 is transmitted to the on-premise gaming monitoring server for further analysis. In some embodiments, the event data packet prepared at step 1340 may alternatively or additionally be transmitted to the remote gaining monitoring server 1130 for further analysis.

Various steps of method 1300 may be performed in a multi-threading computing environment to respond in parallel to the various events occurring on the gaming table 1102. For example, if multiple game objects are detected at 1320, then a separate processing thread for steps 1330, 1340, and 1350 may be initiated for each detected game object.

In some embodiments, part or all of the steps 1320, 1330 and 1340 may be performed by the edge computing device 1106 operating in cooperation with the on-premise gaming monitoring server 1110. The processing workload of the steps 1320, 1330 and 1340 may be distributed across the edge computing device 1106 and the on-premise gaming monitoring server 1110 to meet the latency and scalability requirements of the gaming monitoring system 1100.

FIG. 14 illustrates a flowchart of a method 1400 performed by the on-premise gaming monitoring device 1110, according to some embodiments. In some embodiments, method 1400 may be performed by the remote gaming monitoring server 1130 comprising the various software and hardware components described with reference to the on-premise gaming monitoring device 1110.

At 1410, the on-premise gaming monitoring device 1110 receives the event data packet prepared at step 1340 of FIG. 13. At optional step 1420, the game object game object value may be determined by the game object value estimation module 126. Step 1420 may incorporate the various image processing operations described with reference to step 630 of FIG. 6.

At step 1430, the image segments corresponding to persons or players in the event data packet are analysed by the pose estimation module 125 to estimate pose or posture information associated with each player. The estimation of pose or posture information may include semantic segmentation of the image segment to identify specific body parts of the player in the image segment. The identified specific body parts may include one or more of head, left hand, right hand, torso, for example. In some embodiments, the semantic segmentation may be limited to only identify: head, left hand and right hand, for example. Step 1430 may also include a definition of a bounding box around each identified body part based on the result of the semantic segmentation operation. In some embodiments, the semantic segmentation to identify distinct body parts of the players may be performed using Google's Semantic Image Segmentation with DeepLab in TensorFlow implementation as described in the paper titled 'Encoder-Decoder with Atrous Separable Convolution for Semantic Image Segmentation' by Chen et al. published by the European Conference on Computer Vision 2018, the contents of which are hereby incorporated by reference.

Pose estimation of step 1430 may also include determination of U and V coordinates (exemplified in 330) associated with the 3D surface model described with reference to FIG. 3 for each identified body part in the image segment using the pose estimation or analysis framework described with reference to the pose estimation module 125 of FIG. 1.

After determining bounding boxes around the hands of each player at 1430, at 1440, a hand image segment closest to the game object is identified. In some embodiments, distances between the hands and the game object may be evaluated using the mathematical formula described with reference to FIG. 17.

At 1450, based on the identified hand image segment closest to the game object, an image region of a target player's face associated with the hand image segment closest to the game object may be determined. The image segment corresponding to the target player's face may be used to identify the target player by comparison with the records in the facial feature and identity database 189.

In some embodiments, the event data packet 1410 may comprise a series of additional image frames or additional image frame segments captured immediately before or after the occurrence of an event is determined at step 1340. The series of additional images may allow the validation of determinations made by the on-premise gaming monitoring server 1110. In some embodiments, the target player may momentarily look away from the camera system 1104. If the image region determined at 1450 relates to an image where the target player is looking away or where a sufficient extent of the target player's face is not captured, the series of additional image frames may be analysed through steps 1460 and 1470 to obtain a better, more information-rich or a more feature-rich image segment corresponding to the target player's face. The more information-rich or feature-rich image segment corresponding to the target player's face may comprise both eye-regions of the target player providing an image thereby showing a greater proportion of the player's overall face.

At 1460, the series of additional images may be analysed by the face orientation determination module 1289 to determine orientation information for the target player's face in each of the series of additional image frames or additional image frame segments and the target players' face image region determined at 1450. At 1470, based on the orientation information determined at 1460, the most head-on or most feature-rich or most informative image segment corresponding to the target player's face is identified from among the series of additional image frames or additional image frame segments and the target players' face image region determined at 1450.

At 1480, similar to step 660 described with reference to FIG. 6, the face recognition module 127 processes the target player's face image segment identified at 1450 or 1470 to obtain a vector representation or an embedding representation of the target player's face. The embedding representation of the target player's face incorporates information encoding distinct facial features of the player and allows comparison with a database of similarly encoded information of facial features. In some embodiments, the on-premise gaming monitoring computing device 1110 may also determine an identity of the target player by comparing the embedding representation of the target player's face determined at 1480 with the various records in the facial feature and identity database 1287. The identity of the target player may include information regarding the player's name, address, date of birth, membership identifier allocated by the gaming venue or any other identifiers or information to uniquely identify the player, for example.

At 1490, similar to step 670 described with reference to FIG. 6, the on-premise gaming monitoring computing device 1110 may transmit to the remote gaming monitoring server 180 the information regarding the determined gaming event and the target player. Information regarding the determined gaming event may include the nature of the gaming event, for example, placement of a game object at an identified region of interest on a particular table. The game event information may include a unique identifier corresponding to the table and a region of the table where the gaming event occurred and a timestamp at which the gaming event occurred. The timestamp may include a date, time of the day and time zone information. The time of the day may include an hour and a minute information. In some embodiments, the time of the day may include an hour, a minute and a second information. Game event information may also include a game object value associated with the game event. Transmitted information regarding the target player may include the embedding representation of the target player's face determined at 1480.

In some embodiments, the various steps of the method 1400 of FIG. 14 may be performed by the on premise gaming monitoring server 1110 operating in cooperation with the remote gaming monitoring server 1130. The processing workload of the various steps of the method 1400 may be distributed across the on premise gaming monitoring server 1110 and the remote gaming monitoring server 1130 to meet the latency and scalability requirements of the gaming monitoring system 1100.

Figure 15:
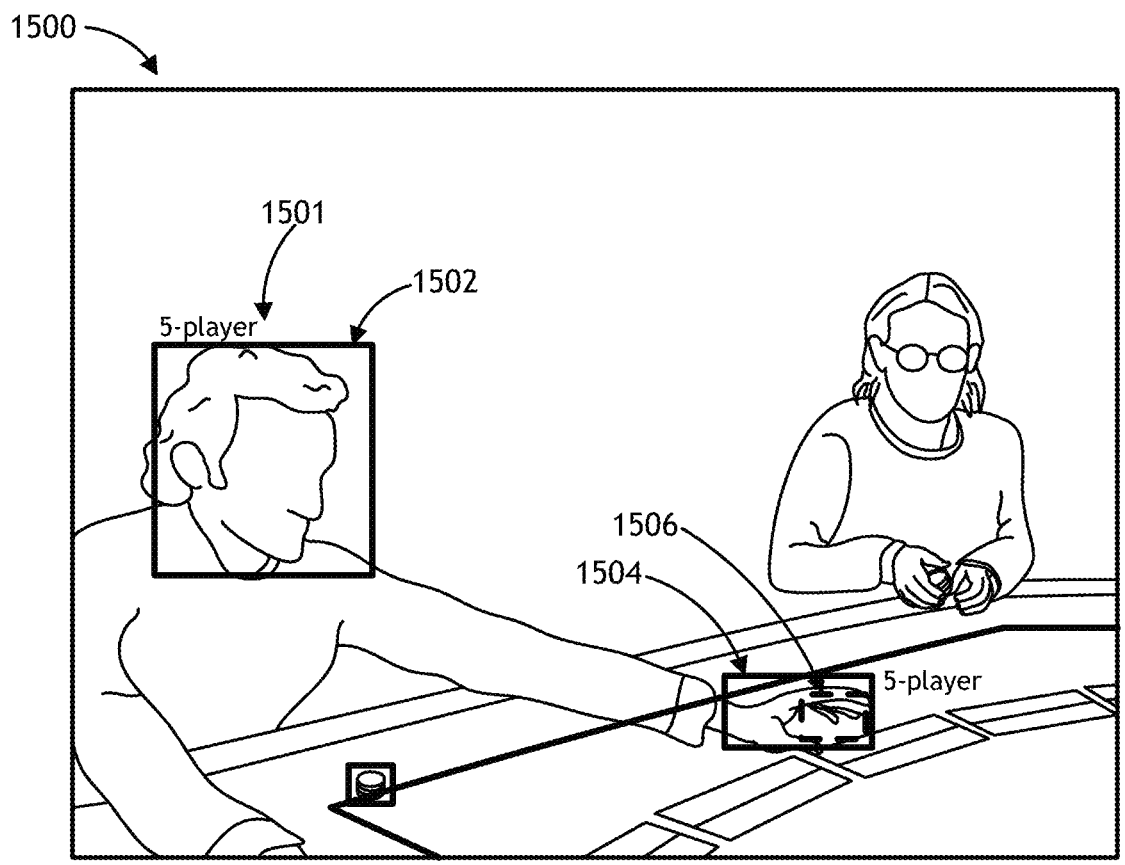
FIG. 15 is an image of an example gaming environment illustrating part of a method of gaming monitoring according to some embodiments.

FIG. 15 illustrates an image 1500 frame showing some results of the object detection and pose estimation operations performed by the edge gaming monitoring device 1106 and the on-premise gaming monitoring server 1110 or alternatively by the gaming monitoring computing device 120. A face bounding box 1502 demarks a face region of a target player 1501. A left-hand bounding box 1504 demarks a left-hand region of the target player. A game object bounding box 1506 demarks a game object. The left-hand bounding box 1504 is closest to the game object bounding box 1506 an accordingly the hand region of the target player 1501 may be associated with the game object in the game object bounding box 1506. By the association of the hand region of player 1501 with the game object in the game object bonding box 1506, the player's 1501's face region in the face bounding box 1052 may be associated with the game object in the game object bounding box 1506.

Figure 16:
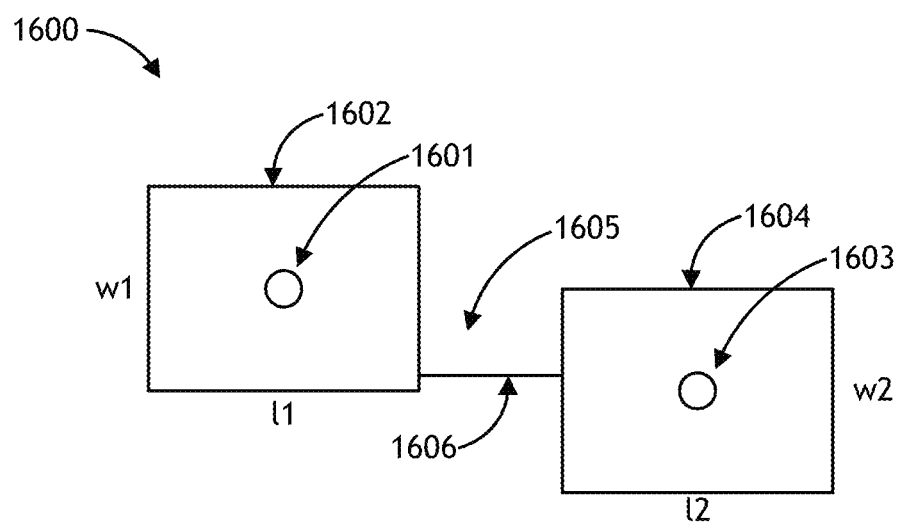
FIG. 16 a schematic diagram of an example of the determination of a distance between two bounding boxes.

FIG. 16 illustrates a schematic diagram 160 of an example of determination of a distance between two bounding boxes 1602 and 1604. Bounding box 1702 may have a centre point 1601 with coordinates (x1, y1). Bounding box 1602 may have a length of l1 and width of w1. Bounding box 1604 may have a centre point 1603 with coordinates (x2, y2). Bounding box 1604 may have a length of l2 and width of w2. A length of the segment 1706 may be determined using the formula:

$$\max(|x_1-x_2|-(l_1+l_2)/2, |y_1-y_2|-(w_1+w_2)/2)$$

The above formula may be used at step 1440 of FIG. 14 or step 650 of FIG. 6 to determine distances between bounding boxes around hands of players and a game object. The bounding box 1602 may correspond to a bounding box around the hand of a player (for example bounding box 1504 of FIG. 15). The bounding box 1605 may correspond to a bounding box around a game object (for example bounding box 1506 of FIG. 15).

Figure 17:
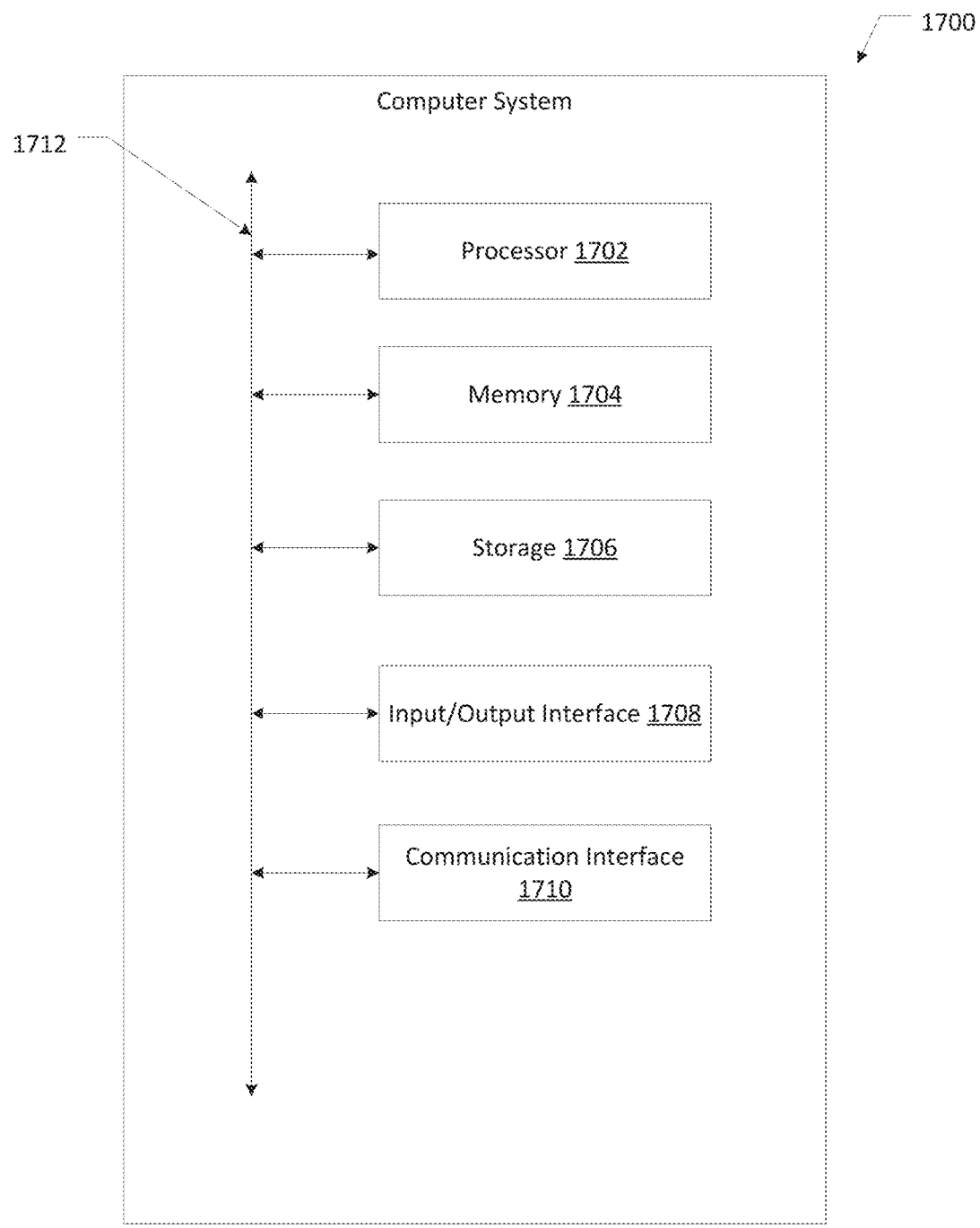
FIG. 17 illustrates an example computer system architecture according to some embodiments.

FIG. 17 illustrates an example computer system 1700 according to some embodiments. In particular embodiments, one or more computer systems 1700 perform one or more steps of one or more methods described or illustrated herein. In particular embodiments, one or more computer systems 1700 provide functionality described or illustrated herein. In particular embodiments, software running on one or more computer systems 1700 performs one or more steps of one or more methods described or illustrated herein or provides functionality described or illustrated herein. Particular embodiments include one or more portions of one or more computer systems 1700. Herein, reference to a computer system may encompass a computing device, and vice versa, where appropriate. Moreover, reference to a computer system may encompass one or more computer systems, where appropriate. Computing device 120, gaming monitoring server 180, edge computing device 1106, on premise gaming monitoring server 1110, remote gaming monitoring server 1130 are examples of computer system 1700.

This disclosure contemplates any suitable number of computer systems 1700. As example and not by way of limitation, computer system 1700 may be an embedded computer system, a system-on-chip (SOC), a single-board computer system (SBC) (such as, for example, a computer-on-module (COM) or system-on-module (SOM)), a special-purpose computing device, a desktop computer system, a laptop or notebook computer system, a mobile telephone, a server, a tablet computer system, or a combination of two or more of these. Where appropriate, computer system 1700 may: include one or more computer systems 1700: be unitary or distributed; span multiple locations; span multiple machines; span multiple data centers; or reside partly or wholly in a computing cloud, which may include one or more cloud computing components in one or more networks. Where appropriate, one or more computer systems 1700 may perform without substantial spatial or temporal limitation one or more steps of one or more methods described or illustrated herein. As an example and not by way of limitation, one or more computer systems 1700 may perform in real time or in batch mode one or more steps of one or more methods described or illustrated herein. One or more computer systems 1700 may perform at different times or at different locations one or more steps of one or more methods described or illustrated herein, where appropriate.

In particular embodiments, computer system 1700 includes at least one processor 1702, memory 1704, storage 1706, an input/output (I/O) interface 1708, a communication interface 1710, and a bus 1712.

In particular embodiments, processor 1702 includes hardware for executing instructions, such as those making up a computer program. As an example and not by way of limitation, to execute instructions, processor 1702 may retrieve (or fetch) the instructions from an internal register, an internal cache, memory 1704, or storage 1706; decode and execute them; and then write one or more results to an internal register, an internal cache, memory 1704, or storage 1706. In particular embodiments, processor 1702 may include one or more internal caches for data, instructions, or addresses. This disclosure contemplates processor 1702 including any suitable number of any suitable internal caches, where appropriate. As an example and not by way of limitation, processor 1702 may include one or more instruction caches, one or more data caches, and one or more translation lookaside buffers (TLBs). Instructions in the instruction caches may be copies of instructions in memory 1704 or storage 1706, and the instruction caches may speed up retrieval of those instructions by processor 1702. Data in the data caches may be copies of data in memory 1704 or storage 1706 for instructions executing at processor 1702 to operate on; the results of previous instructions executed at processor 1702 for access by subsequent instructions executing at processor 1702 or for writing to memory 1704 or storage 1706: or other suitable data. The data caches may speed up read or write operations by processor 1702. The TLBs may speed up virtual-address translation for processor 1702. In particular embodiments, processor 1702 may include one or more internal registers for data, instructions, or addresses. This disclosure contemplates processor 1702 including any suitable number of any suitable internal registers, where appropriate. Where appropriate, processor 1702 may include one or more arithmetic logic units (ALUs); be a multi-core processor; or include one or more processors 1702. Although this disclosure describes and illustrates a particular processor, this disclosure contemplates any suitable processor.

In particular embodiments, memory 1704 includes main memory for storing instructions for processor 1702 to execute or data for processor 1702 to operate on. As an example and not by way of limitation, computer system 1700 may load instructions from storage 1706 or another source (such as, for example, another computer system 1700) to memory 1704. Processor 1702 may then load the instructions from memory 1704 to an internal register or internal cache. To execute the instructions, processor 1702 may retrieve the instructions from the internal register or internal cache and decode them. During or after execution of the instructions, processor 1702 may write one or more results (which may be intermediate or final results) to the internal register or internal cache. Processor 1702 may then write one or more of those results to memory 1704. In particular embodiments, processor 1702 executes only instructions in one or more internal registers or internal caches or in memory 1704 (as opposed to storage 1706 or elsewhere) and operates only on data in one or more internal registers or internal caches or in memory 1704 (as opposed to storage 1706 or elsewhere). One or more memory buses (which may each include an address bus and a data bus) may couple processor 1702 to memory 1704. Bus 1712 may include one or more memory buses, as described below. In particular embodiments, one or more memory management units (MMUs) reside between processor 1702 and memory 1704 and facilitate accesses to memory 1704 requested by processor 1702. In particular embodiments, memory 1704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1704 may include one or more memories 1704, where appropriate. Although this disclosure describes and illustrates particular memory, this disclosure contemplates any suitable memory.

In particular embodiments, storage 1706 includes mass storage for data or instructions. As an example and not by way of limitation, storage 1706 may include a hard disk drive (HDD), a floppy disk drive, flash memory, an optical disc, a magneto-optical disc, magnetic tape, or a Universal Serial Bus (USB) drive or a combination of two or more of these. Storage 1706 may include removable or non-removable (or fixed) media, where appropriate. Storage 1706 may be internal or external to computer system 1700, where appropriate. In particular embodiments, storage 1706 is non-volatile, solid-state memory. In particular embodiments, storage 1706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1706 taking any suitable physical form. Storage 1706 may include one or more storage control units facilitating communication between processor 1702 and storage 1706, where appropriate. Where appropriate, storage 1706 may include one or more storages 1706. Although this disclosure describes and illustrates particular storage, this disclosure contemplates any suitable storage.

In particular embodiments. I/O interface 1708 includes hardware, software, or both, providing one or more interfaces for communication between computer system 1700 and one or more I/O devices. Computer system 1700 may include one or more of these I/O devices, where appropriate. One or more of these I/O devices may enable communication between a person and computer system 1700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1708 for them. Where appropriate, I/O interface 1708 may include one or more device or software drivers enabling processor 1702 to drive one or more of these I/O devices. I/O interface 1708 may include one or more I/O interfaces 1708, where appropriate. Although this disclosure describes and illustrates a particular I/O interface, this disclosure contemplates any suitable I/O interface.

In particular embodiments, communication interface 1710 includes hardware, software, or both providing one or more interfaces for communication (such as, for example, packet-based communication) between computer system 1700 and one or more other computer systems 1700 or one or more networks. As an example and not by way of limitation, communication interface 1710 may include a network interface controller (NIC) or network adapter for communicating with a wireless adapter for communicating with a wireless network, such as a WI-FI or a cellular network. This disclosure contemplates any suitable network and any suitable communication interface 1710 for it. As an example and not by way of limitation, computer system 1700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1700 may communicate with a wireless cellular telephone network (such as, for example, a Global System for Mobile Communications (GSM) network, or a 3G, 4G or 5G cellular network), or other suitable wireless network or a combination of two or more of these. Computer system 1700 may include any suitable communication interface 1710 for any of these networks, where appropriate. Communication interface 1710 may include one or more communication interfaces 1710, where appropriate. Although this disclosure describes and illustrates a particular communication interface, this disclosure contemplates any suitable communication interface.

In particular embodiments, bus 1712 includes hardware, software, or both coupling components of computer system 1700 to each other. As an example and not by way of limitation, bus 1712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1712 may include one or more buses 1712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays iFPGAs) or application-specific ICs (ASICs)), hard disk drives (HDDs), hybrid hard drives (HHDs), optical discs, optical disc drives (ODDs), magneto-optical discs, magneto-optical drives, (FDDs), solid-state drives (SSDs), RAM-drives, or any other suitable computer-readable non-transitory storage media, or any suitable combination of two or more of these, where appropriate. A computer-readable non-transitory storage medium may be volatile, non-volatile, or a combination of volatile and non-volatile, where appropriate.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

It will be appreciated by persons skilled in the art that several variations or modifications may be made to the described embodiments, without departing from the broad general scope of the present disclosure. The described embodiments are, therefore, to be considered in all respects as illustrative.

The invention claimed is:

1. A method for monitoring gaming activity in a gaming area comprising a gaming table, the method comprising:
   providing at least one camera configured to capture images of the gaming area, at least one processor configured to communicate with the at least one camera and a memory storing instructions executable by the at least one processor;
   determining by the at least one processor, a presence of a first gaming object on the gaming table in a first image from a series of images of the gaming area captured by the at least one camera, the series of images comprising one or more images;
   responsive to determining the presence of the first gaming object in the first image, processing by the at least one processor the first image to estimate postures of one or more players;
   based on the estimated postures, determining by the at least one processor a first target player associated with the first gaming object among the one or more players.

2. The method of claim 1, further comprising identifying by the at least one processor in the series of images an image region of a face of the first target player associated with the first gaming object.

3. The method of claim 1, wherein estimating postures of one or more players in the first image comprises identifying one or more periphery indicator regions in the first image, each periphery indicator region corresponding to a distal hand periphery of one or more players.

4. The method of claim 3, wherein each of the one or more periphery indicator regions corresponds to a distal left hand periphery or a distal right hand periphery.

5. The method of claim 1, further comprising determining by the at least one processor the first target player associated with the first gaming object by:
   estimating a distance of each periphery indicator region from the first gaming object in the first image;
   identifying a closest periphery indicator region based on the estimated distance; and
   determining the first target player associated with the first gaming object based on the identified closest periphery indicator region.

6. The method of claim 5, wherein processing by the at least one processor the first image to estimate postures comprises estimating a skeletal model of one or more player, and wherein determining the first target player associated with the first gaming object is based on the estimated skeletal model of one or more player.

7. The method of claim 6, wherein estimating the skeletal model of one or more player comprises estimating key points in the first image associated with one or more of: wrists, elbows, shoulders, neck, nose, eyes or ears of the one or more players.

8. The method of claim 1, further comprising:
- determining by the at least one processor, a presence of a second gaming object on the gaming table in a second image from the series of images;
- responsive to determining the presence of the second gaming object in the second image, process by the at least one processor the second image to estimate postures of one or more players;
- based on the estimated postures, determine by the at least one processor, a second target player associated with the second gaming object among the one or more players.

9. The method of claim 1, wherein the first gaming object comprises any one of: a game object, a token, a currency note or a coin.

10. The method of claim 1, wherein the memory comprises one or more posture estimation machine learning models trained to estimate postures of one or more players in the series of images.

11. The method of claim 10, wherein the one or more posture estimation machine learning models comprise one or more deep learning artificial neural networks trained to estimate postures of one or more players in the captured images.

12. The method of claim 2, wherein identifying by the at least one processor an image region of a face of the first target player comprises extracting a vector representation of the face of the first target player using a face recognition machine learning model stored in the memory.

13. The method of claim 1, further comprising estimating by the at least one processor a game object value associated with the first gaming object.

14. The method of claim 1, wherein determining presence of a first gaming object on the gaming table further comprises determining a gaming table zone associated with the first gaming object.

15. The method of claim 1, further comprising identifying in the series of images a plurality of face regions corresponding to a face of the first target player associated with the first gaming object.

16. The method of claim 15, further comprising processing the plurality of face regions to determine face orientation information of the first target player's face in each of the plurality of face regions.

17. The method of claim 16, further comprising processing the face orientation information of the first target player's face in each of the plurality of face regions to determine a most head-on face region corresponding to the target player.

18. The method of claim 1, wherein the captured images comprise depth of field images; and
- determination of a presence of a first gaming object on the gaming table is based on the depth of field images.

19. Non-transient computer readable storage media storing program code, the program code executable by at least one processor to configure the at least one processor to perform the method of claim 1.

* * * * *